US007278000B2

(12) United States Patent
Nonaka et al.

(10) Patent No.: US 7,278,000 B2
(45) Date of Patent: Oct. 2, 2007

(54) DATA MIGRATION WITH WORM GUARANTEE

(75) Inventors: Yusuke Nonaka, Sagamihara (JP); Naoto Matsunami, Hayamamachi (JP); Akira Nishimoto, Sagamihara (JP); Yutaka Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 10/960,053

(22) Filed: Oct. 8, 2004

(65) Prior Publication Data
US 2006/0031651 A1 Feb. 9, 2006

(30) Foreign Application Priority Data
Aug. 3, 2004 (JP) ............................ 2004-226598

(51) Int. Cl.
G06F 12/14 (2006.01)
G06F 12/16 (2006.01)

(52) U.S. Cl. .................... 711/163; 711/112; 711/162

(58) Field of Classification Search ............... 711/163, 711/112, 161, 162, 165, 114, 152, 154; 707/204; 360/60
See application file for complete search history.

(56) References Cited

U.S. PATENT DOCUMENTS

| | | | | |
|---|---|---|---|---|
| 6,216,202 | B1 * | 4/2001 | D'Errico .................... | 711/112 |
| 6,317,281 | B1 * | 11/2001 | Ogawa et al. ............... | 360/60 |
| 7,024,522 | B2 * | 4/2006 | Mannen et al. ............. | 711/152 |
| 7,080,221 | B1 * | 7/2006 | Todd et al. ................. | 711/161 |
| 7,107,421 | B2 * | 9/2006 | Kaneda et al. .............. | 711/162 |
| 2001/0049776 | A1 * | 12/2001 | Maeda ....................... | 711/162 |
| 2002/0144070 | A1 * | 10/2002 | Watanabe et al. ............ | 711/165 |
| 2003/0028737 | A1 * | 2/2003 | Kaiya et al. ................ | 711/162 |
| 2003/0037211 | A1 * | 2/2003 | Winokur .................... | 711/162 |
| 2003/0188119 | A1 * | 10/2003 | Lubbers et al. ............ | 711/170 |
| 2005/0060505 | A1 * | 3/2005 | Kasako et al. ............. | 711/162 |
| 2005/0289553 | A1 * | 12/2005 | Miki ......................... | 718/104 |

FOREIGN PATENT DOCUMENTS

JP 2003-108315 4/2003

OTHER PUBLICATIONS

" EMC Centera", searched online on May 28, 2004, Internet URL:http://www.emc.com/pdf/products/centera/centera_guide.pdf. pp. 1-19.
"NetApp NearStore", searched online on May 28, 2004, Internet URL:http://www.netapp.com/products/nearstore/.

* cited by examiner

Primary Examiner—Reginald Bragdon
Assistant Examiner—Victor Wang
(74) Attorney, Agent, or Firm—Antonelli, Terry, Stout & Kraus, LLP.

(57) ABSTRACT

The storage system is coupled to a computer, and includes a controller and a disk drive including a plurality of logical volumes, at least in one of which updating prohibition information indicating inclusion of an area assigned an updating prohibition attribute is recorded. The controller includes a configuration management module that sets the logical volume assigned the updating prohibition attribute as a logical volume of a migration source, another logical volume as a logical volume of a migration destination, and the updating prohibition information concerning the logical volume of the migration source in the logical volume of the migration destination, and a migration module that copies data of the logical volume of the migration source to the logical volume of the migration destination after the setting of the updating prohibition information concerning the logical volume of the migration source in the logical volume of the migration destination.

15 Claims, 22 Drawing Sheets

FIG. 6

VOLUME MANAGEMENT TABLE 117a

| INTERNAL LUN 601 | CAPACITY 602 | I/O CONTROL TYPE 603 | WORM UNIT 604 | MIGRATION STATE 605 | MIGRATION PAIR LUN 606 | PATH SWITCHING 607 | WORM ATTRIBUTE 608 |
|---|---|---|---|---|---|---|---|
| 0 | 50GB | NORMAL | | NONE | — | — | — |
| 1 | 100GB | WORM | SECTOR | MIGRATION SOURCE | INTERNAL LU (LUN=2) | UNDONE | |
| 2 | 100GB | WORM | SECTOR | MIGRATION DESTINATION | INTERNAL LU (LUN=1) | UNDONE | |
| 3 | 120GB | WORM | SECTOR | MIGRATION SOURCE | STORAGE SYSTEM 101b (LUN=1) | UNDONE | |
| 4 | 40GB | WORM | VOLUME | MIGRATION SOURCE | STORAGE SYSTEM 101c (LUN=3) | DONE | |

- 6091 — WORM ATTRIBUTE (1)
- 6092 — WORM ATTRIBUTE (2)
- 6093 — WORM ATTRIBUTE (3)

WORM ATTRIBUTE OF INTERNAL LUN=1

WORM SECTOR RANGETABLE

|  | START ADDRESS | END ADDRESS |
|---|---|---|
| WORM AREA 1 | 50 | 100 |
| WORM AREA 2 | 120 | 140 |
| WORM AREA 3 | 240 | 400 |
| ⋮ | | |
| WORM AREA n | a1 | a2 |

HISTORY TABLE

| DATE | TIME | DEVICE | LUN | STATE |
|---|---|---|---|---|
| 2004/4/26 | 00:11:22 | ZZZ | LU0 | NEW CREATION |
| 2004/5/28 | 11:33:22 | ZZZ | LU3 | START OF MIGRATION |
| 2004/5/28 | 13:33:12 | ZZZ | LU3 | COMPLETION OF MIGRATION |
| 2004/6/25 | 04:22:32 | AAA | LU1 | START OF MIGRATION |
| 2004/6/25 | 06:02:30 | AAA | LU1 | COMPLETION OF MIGRATION |

FIG. 7

PATH MANAGEMENT TABLE 118a

| | 1001 | 1002 | 1003 | 1004 | 1005 | 1006 | 1007 | 1008 | 1009 |
|---|---|---|---|---|---|---|---|---|---|
| | PORT NUMBER | HOST ID | HOST LUN | INTERNAL LUN | MIGRATION STATE | MIGRATION SOURCE | MIGRATION DESTINATION | PATH SWITCHING | DEGREE OF PROGRESSION |
| 1010 | 1 | AAA | 0 | 0 | × | — | — | — | — |
| 1011 | 1 | AAA | 1 | 1 | ○ | INTERNAL LU (LUN=1) | INTERNAL LU (LUN=2) | UNDONE | |
| 1012 | 1 | BBB | 0 | 3 | ○ | INTERNAL LU (LUN=3) | STORAGE DEVICE 101b (LUN=1) | UNDONE | |
| 1013 | 1 | CCC | 0 | 4 | ○ | INTERNAL LU (LUN=4) | STORAGE DEVICE 101b (LUN=3) | DONE | |

1016 — COPIED BITMAP (3)
1015 — COPIED BITMAP (2)
1014 — COPIED BITMAP (1)

DATA MIGRATION WITH WORM GUARANTEE

CLAIM OF PRIORITY

The present application claims priority from Japanese application P2004-226598 filed on Aug. 3, 2004, the content of which is hereby incorporated by reference into this application.

BACKGROUND

This invention relates to data protection for a storage system.

Recent years have seen strengthening of regulations which oblige companies to keep business documents or the like for a long time. A function of preventing erasing or changing of data is required for a storage system which stores data such as business documents. To meet such a requirement, a storage system equipped with a WORM function (Write Once Read Many: updating prohibition function) has been provided (e.g., see EMC Corporation, "EMC Centera", [online], [searched on May 28, 2004], Internet <URL: http://www.emc.com/pdf/products/centera/centera_guide.pdf>, and Network Appliance, "NetApp NearStore", [online], [searched on May 28, 2004], Internet <URL: http://www.netapp.com/products/nearstore/>). The storage system having such a WORM function stores data to which a WORM attribute has been assigned so as to prevent updating (including erasing and changing) thereof for a given period of time.

Under the obligation to store the data, however, a data storage period may exceed a life of the storage system. In such a case, movement (migration) of data stored in an old storage system to a new storage system is necessary.

Additionally, there has recently been emerged an idea of Data LifeCycle Management (DLCM) for managing data throughout its lifetime from creation to erasure. According to the DLCM, when a value of data changes over time, it is advisable to move the data to a storage system of costs corresponding to the value.

However, when a computer system that includes the storage system is stopped for data migration, business is brought to a halt for this period to cause economic losses. Thus, there has been proposed a storage system equipped with a function of moving data without any system stoppage (e.g., JP 2003-108315 A).

SUMMARY

The data migration is executed by copying data of a migration source storage system to a migration destination storage system. In the aforementioned conventional migration, however, no consideration has been given to copying of the WORM attribute of the data along with the data. That is, in the conventional migration, no method is available for protecting data from being updated during a period from a start of data copying to its end.

Furthermore, since the data cannot be erased from an area of the migration source storage system to which the WORM attribute has been assigned (e.g., logical volume to which the WORM attribute has been assigned), it is impossible to reuse this area.

According to this invention, there is provided a storage system coupled to a computer through a network, comprising: a controller and a disk drive coupled to the controller to communicate therewith, wherein the disk drive includes a plurality of logical volumes, at least in one of which updating prohibition information indicating inclusion of an area assigned an updating prohibition attribute is recorded; and the controller includes: a configuration management module that sets the logical volume assigned the updating prohibition attribute as a logical volume of a migration source, another logical volume as a logical volume of a migration destination, and the updating prohibition information concerning the logical volume of the migration source in the logical volume of the migration destination; and a migration module that copies data of the logical volume of the migration source to the logical volume of the migration destination after the setting of the updating prohibition information concerning the logical volume of the migration source in the logical volume of the migration destination.

According to this invention, the WORM attribute of the data is copied along with the data when the migration is executed. Thus, even during the copying, the data to which the WORM attribute has been assigned is protected from being updated. Moreover, the data to which the WORM attribute has been assigned before copying is protected as in the case before the copying even without assigning the WORM attribute again after the end of the copying.

Furthermore, according to this invention, by releasing the WORM attribute of the migration source after the end of data copying, it is possible to reuse the area to which the WORM attribute has been assigned.

BRIEF DESCRIPTION OF THE DRAWINGS

FIG. 6 is an explanatory diagram of a volume management table of one storage system according to the embodiment of this invention.

FIG. 7 is an explanatory diagram of a WORM attribute table according to the embodiment of this invention.

DETAILED DESCRIPTION OF THE PREFERRED EMBODIMENTS

Three embodiments of computer systems to which this invention is applied are conceivable. To begin with, referring to FIGS. 1 to 3, configurations of the computer systems of the three embodiments will be described.

Figure 1:
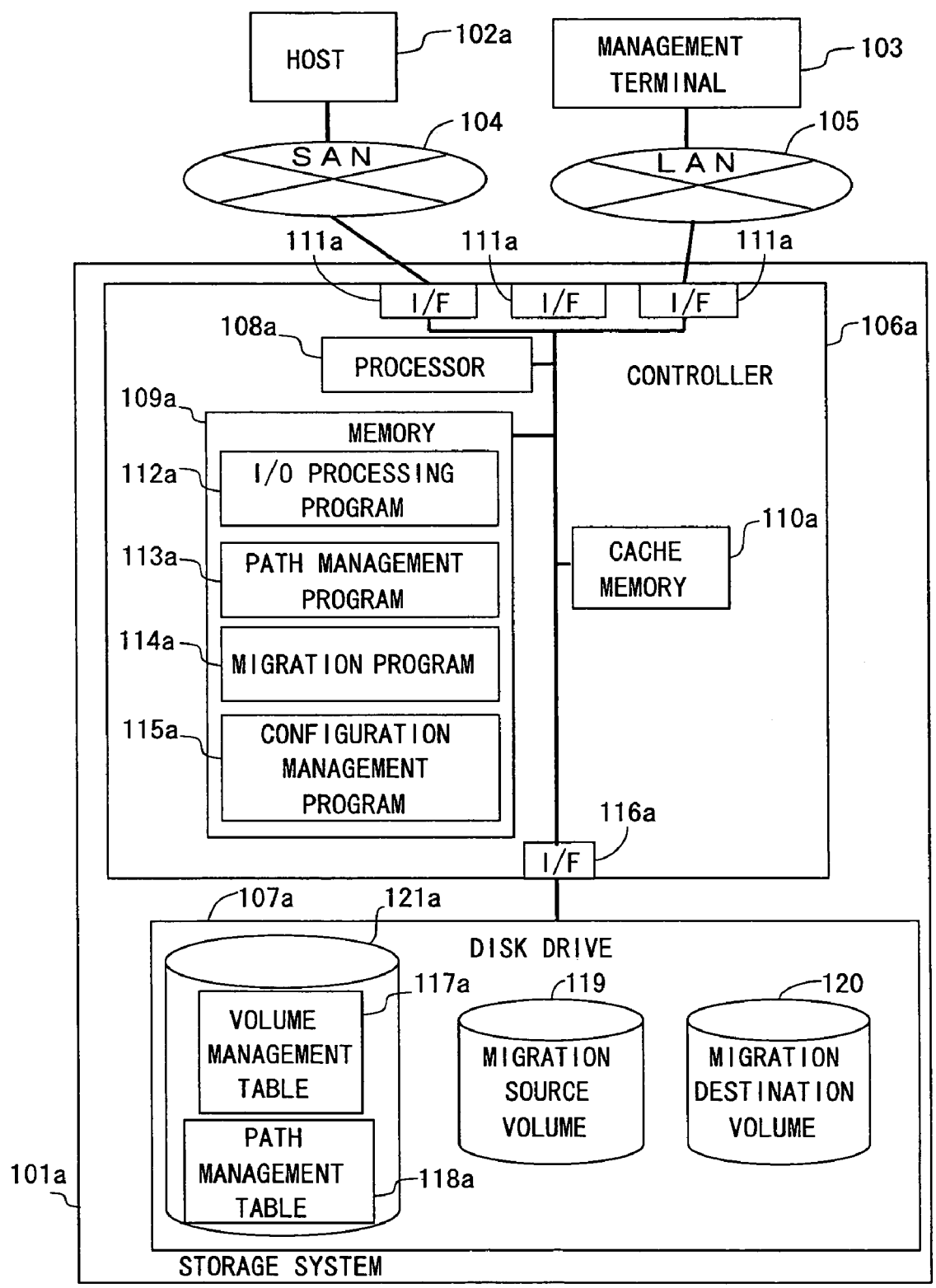
FIG. 1 is a block diagram showing a configuration of a computer system for executing data migration in a storage system according to an embodiment of this invention.

FIG. 1 is a block diagram showing a configuration of a computer system for executing data migration in a storage system according to an embodiment of this invention.

The computer system of FIG. 1 includes a storage system 101a, a host 102a, and a management terminal 103.

The storage system 101a and the host 102a are interconnected to communicate with each other through Storage Area Network (SAN) 104. Communication is executed between the storage system 101a and the host 102a by, e.g., a Fibre Channel (FC) protocol.

The host 102a is a computer which includes a CPU, a memory, an I/O device, and the like, and issues a data I/O command to the storage system 101a through the SAN 104.

The storage system 101a and the management terminal 103 are interconnected to communicate with each other through Local Area Network (LAN).

The management terminal 103 is a computer which includes a CPU, a memory, an I/O device, and the like, and performs various setting operations for the storage system 101a through the LAN 105. The setting operations will be described in detail later.

The storage system 101a includes a controller 106a, and a disk drive 107a.

The controller 106a processes the I/O command from the host 102a, and writes data in the disk drive 107a, or reads data therefrom. The controller 106a includes a processor 108a, a memory 109a, a cache memory 110a, an external interface (I/F) 111a, and a drive interface 116a.

The processor 108a is a CPU which executes a program stored in the memory 109a.

For example, the memory 109a is a semiconductor memory for storing programs executed by the processor 108a. At least an I/O processing program 112a, a path management program 113a, a migration program 114a, and a configuration management program 115a are stored in the memory 109a.

The I/O processing program 112a processes a data writing or reading command from the host 102a, and controls writing of data in the disk drive 107a or reading of data therefrom. Here, the term "writing" of data includes writing of new data and updating of written data. The term "updating" includes erasing of data.

The path management program 113a controls access path switching. The access path is a route of data access from the host 102a to a given logical volume (described later).

The migration program 114a executes data migration. That is, the migration program 114a copies data of a migration source logical volume to a migration destination logical volume.

The configuration management program 115a communicates with the host 102a or the management terminal 103, and receives instructions from the host 102a or the management terminal 103 to manage a configuration of the storage system 101a. Specifically, for example, the configuration management program 115a sets a logical volume of the disk drive 107a, sets a WORM attribute of each logical volume, specifies a migration source logical volume and a migration destination logical volume when migration is executed, and sets a method of switching an access path.

The WORM attribute is an updating prohibition attribute. Updating of data is prohibited in an area to which the WORM attribute has been assigned.

Operations of the programs will be described in detail later.

For example, the cache memory 110a is a semiconductor memory. In the cache memory 110a, the data written by the host 102a in the disk drive 107a or the data read by the host 102a from the same is temporarily stored. The cache memory 110a is provided to achieve high-speed data I/O processing for the host 102a. Thus, the cache memory 110a need not be provided when it is not necessary to achieve high-speed data I/O processing.

The external I/F 111a is an interface for executing communication between the storage system 101a and the other device. One or a plurality of interfaces are disposed in the controller 106a. In FIG. 1, three external I/Fs 111a are disposed. One is connected to the host 102a through the SAN 104, and another is connected to the management terminal 103 through the LAN 105. For example, the external I/F connected to the host 102a is an FC interface, and the external I/F connected to the management terminal 103 is a so-called LAN adaptor.

The disk drive 107a may be a plurality of disk drives. The disk drive 107a may be a disk array device. The disk drive 107a includes a plurality of logical volumes (LU). The logical volume is an area logically treated as one disk drive. Physically, the logical volume may be an aggregate of partial areas of a plurality of disk drives.

A volume management table 117a and a path management table 118a are stored in at least one of the logical volumes of the disk drive 107a. According to this embodiment, the logical volume in which the volume management table 117a and the path management table 118a are stored is set as a management volume 121a. Additionally, another logical volume of the disk drive 107a is a migration source volume 119, and yet another logical volume is a migration destination volume 120.

The migration source volume 119 and the migration destination volume 120 are logical volumes for which the migration of this invention is executed. That is, data of the migration source volume 119 is copied to the migration destination volume 120. Thus, logical volumes that make a pair in migration are referred to as a migration pair.

For example, the migration source volume 119 includes an old disk drive which is near its quality guarantee deadline, and the migration destination volume 120 includes a new disk drive. When the data of the migration source volume 119 is copied to the migration destination volume 120, the data can be stored over the quality guarantee deadline of the disk drive.

Additionally, for example, the migration source volume 119 includes a high-performance and high-cost disk drive, and the migration destination volume 120 includes a low-cost and low-performance disk drive. When the data of the migration source volume 119 is copied to the migration destination volume 120, the data reduced in value can be stored in the low-cost disk drive which matches the value. Other data of a high value can be stored in an area of the migration source volume 119 vacated by the copying.

The volume management table 117a is for all the logical volumes in the disk drive 107a. For example, the volume management table 117a contains information on a capacity of each logical volume and presence of a WORM attribute. The volume management table 117a also contains information as to whether each logical volume is a migration target. The volume management table 117a further contains information on an identifier of a logical volume which makes a pair with the logical volume of the migration target.

The path management table 118a is for managing a path through which data writing or reading requested by the host 102a is executed. That is, when there is a data writing or reading request from the host 102a, a logical volume of a writing or reading target is selected according to the path management table 118a.

Contents of the volume management table 117a and the path management table 118a will be described in detail later.

Figure 2:
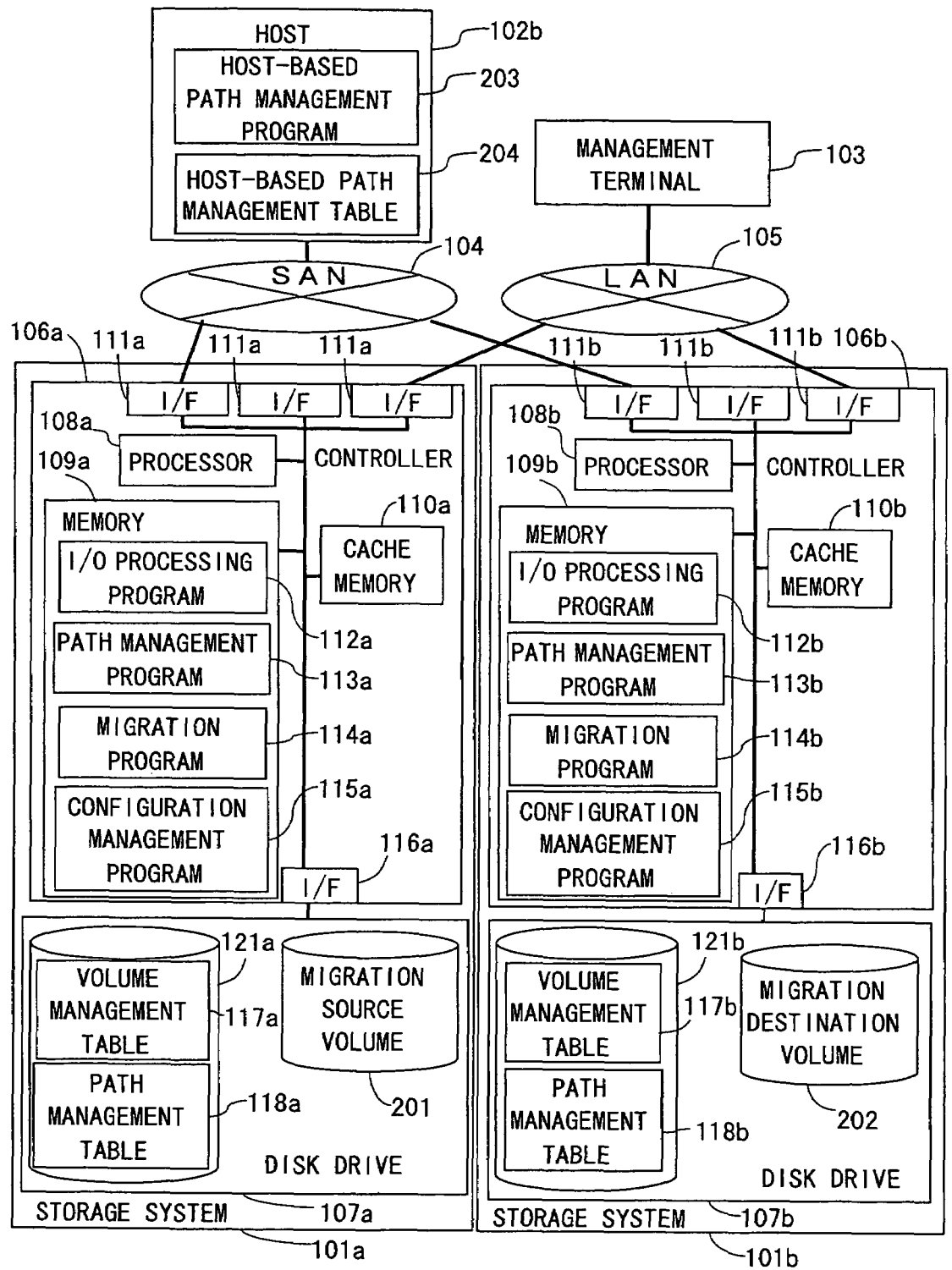
FIG. 2 is a block diagram showing a configuration of a computer system for executing migration between storage systems interconnected through a network according to an embodiment of this invention.

FIG. 2 is a block diagram showing a configuration of a computer system for executing migration between storage systems interconnected through a network according to an embodiment of this invention.

The computer system of FIG. 2 has a configuration in which a storage system 101b is added to the configuration of FIG. 1. The storage system 101b is connected to a SAN 104 and a LAN 105, and can communicate with a host 102b, a management terminal 103, and a storage system 101a.

A configuration of the storage system 101a is as described above with reference to FIG. 1. A configuration of the storage system 101b is similar to that of the storage system 101a. However, a migration source volume 201 is stored in a disk drive 107a of the storage system 101a, and a migration destination volume 202 which makes a pair with the migration source volume 201 is stored in a disk drive 107b of the storage system 101b.

The host 102b of FIG. 2 is a computer which includes a CPU, a memory, an I/O device, and the like as in the case of the host 102a of FIG. 1, and issues a data I/O command to the storage system 101a through the SAN 104. Further, a host-based path management program 203 and a host-based path management table 204 are stored in the memory of the host 102b.

The host-based path management program 203 is executed by the CPU, and equipped with a function similar to that of a path management program 113.

The host-based path management table 204 contains information similar to that of a path management table 118.

The host-based path management program 203 and the host-based path management table 204 will be described in detail later.

Figure 3:
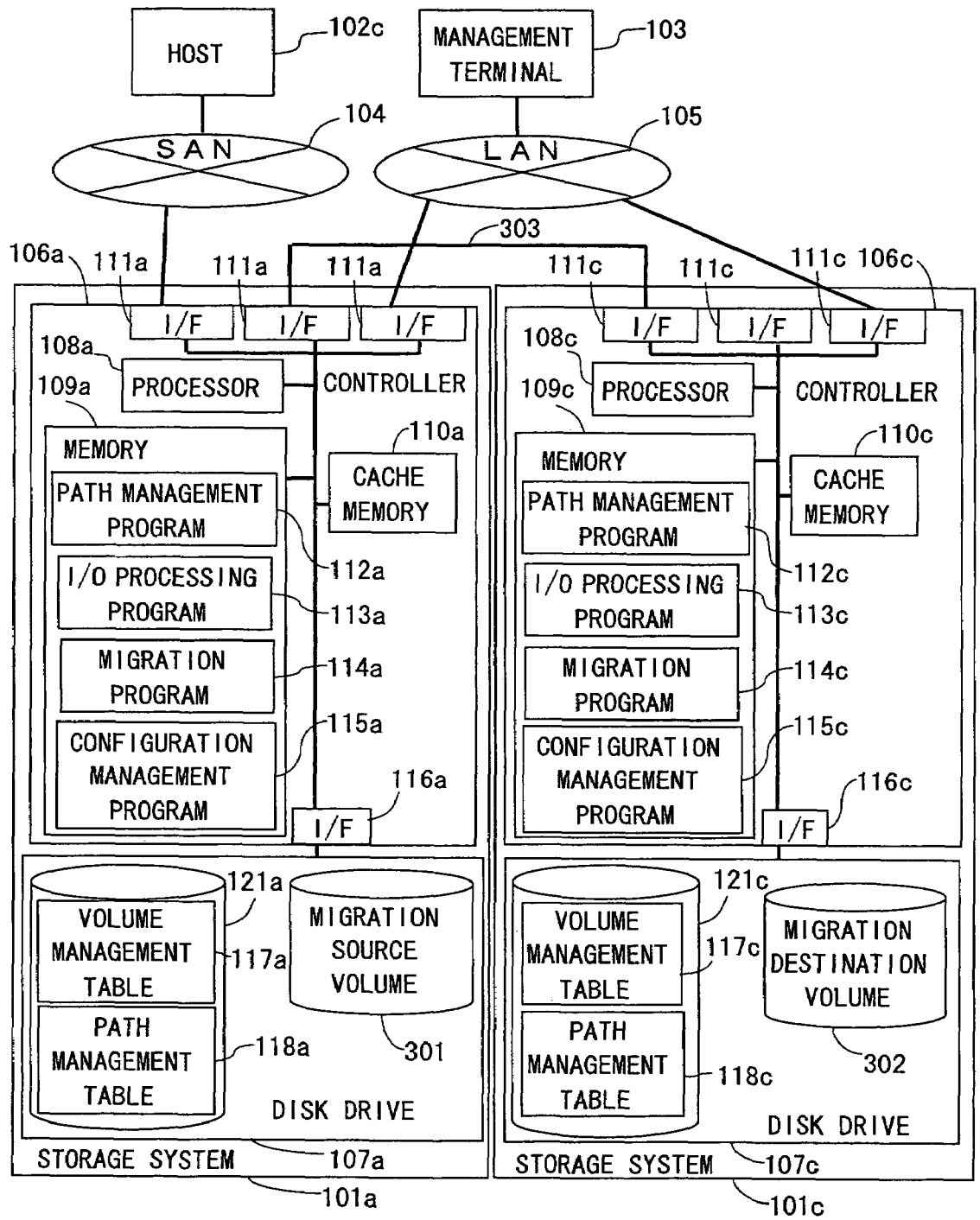
FIG. 3 is a block diagram showing a configuration of a computer system for executing migration between storage systems directly connected to each other according to an embodiment of this invention.

FIG. 3 is a block diagram showing a configuration of a computer system for executing migration between storage systems directly connected to each other according to an embodiment of this invention.

The computer system of FIG. 3 has a configuration in which a storage system 101c is added to the configuration of FIG. 1. The storage system 101c is connected to a storage system 101a and a LAN 105. As a result, the storage system 101c can directly communicate with the storage system 101a, and with a management terminal 103 through the LAN 105.

Data communication is performed through a connection 303 between the storage system 101a and the storage system 101c by, e.g., an FC protocol.

A configuration of the storage system 101a is as described above with reference to FIG. 1. A configuration of the storage system 101c is similar to that of the storage system 101a. However, a migration source volume 301 is stored in a disk drive 107a of the storage system 101a, and a migration destination volume 302 which makes a pair with the migration source volume 301 is stored in a disk drive 107c of the storage system 101c.

It should be noted that this invention can be applied to a configuration in which the migration source volume 301 is stored in the disk drive 107c of the storage system 101c, and the migration destination volume 302 is stored in the disk drive 107a of the storage system 101a.

The computer systems shown in FIGS. 1 to 3 can be configured as one computer system (not shown). That is, the storage system 101b is connected to the computer system of FIG. 1 as shown in FIG. 2, and the storage system 101c is connected as shown in FIG. 3.

In such a case, the hosts 102a, 102b, and 102c are connected to the SAN 104. The migration source volumes 119, 201, and 301 are stored in the disk drive 107a of the storage system 101a. The migration destination volume 120 that makes a pair with the migration source volume 119 is further stored in the disk drive 107a. The migration destination volume 202 that makes a pair with the migration source volume 201 is stored in the disk drive 107b of the storage system 101b. The migration destination volume 302 that makes a pair with the migration source volume 301 is stored in the disk drive 107c of the storage system 101c.

Next, referring to FIGS. 4 and 5, an outline of a migration operation which reflects the WORM attribute of this invention will be described. This operation is common among the computer systems of FIGS. 1 to 3.

According to this invention, among data of the migration source logical volume, data to which the WORM attribute has been assigned (i.e., updating is prohibited) is copied to the migration destination logical volume, and then the WORM attribute is assigned to the data even in the migration destination logical volume. Further, even when there is access from the host 102 during the copying, the data to which the WORM attribute has been assigned is not updated. In this case, control methods are different from each other between the case of setting an access path from the host 102 for the migration destination logical volume (FIG. 4) and the case of setting an access path for the migration source logical volume (FIG. 5).

Figure 4:
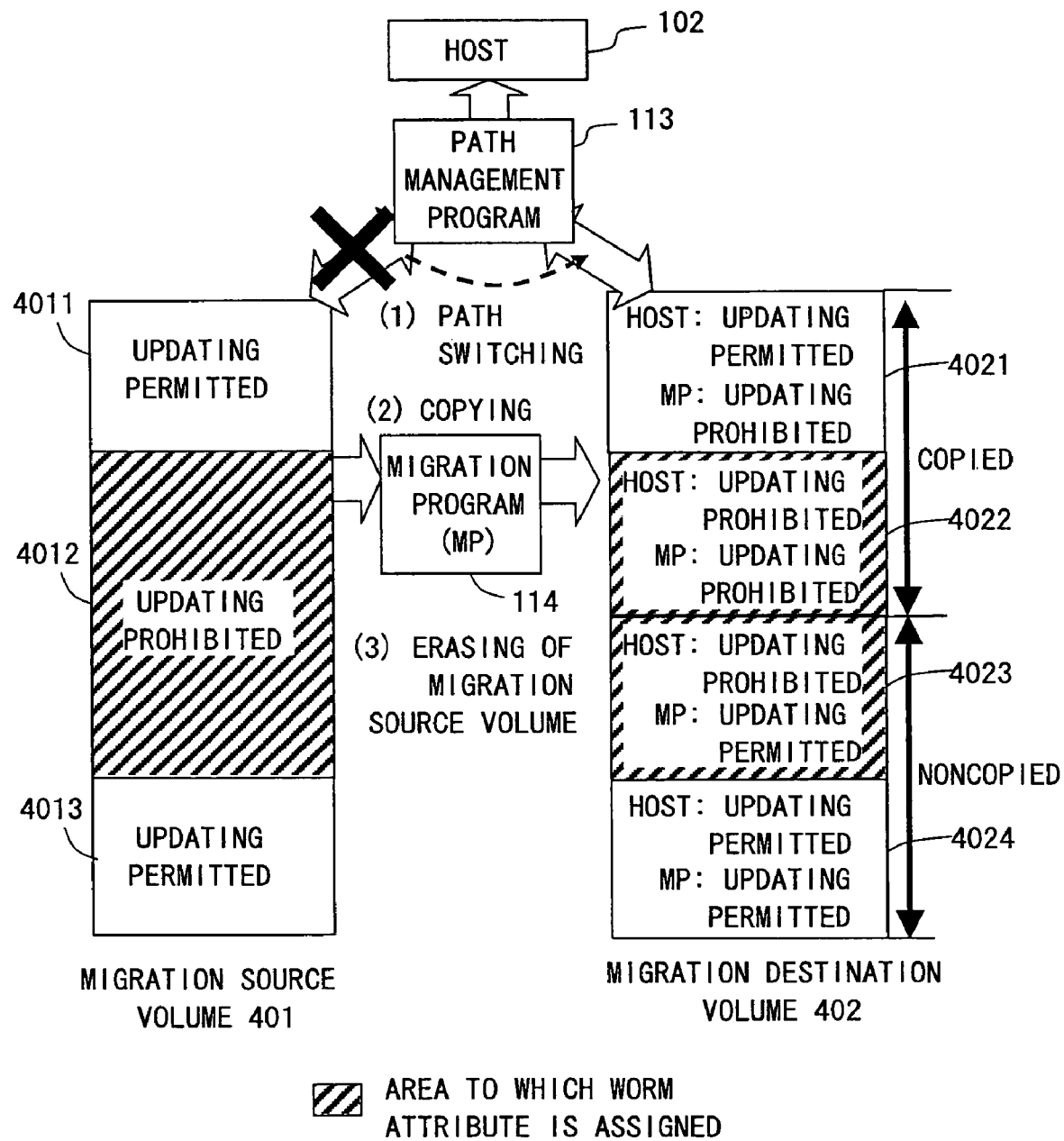
FIG. 4 is an explanatory diagram of a system for switching an access path before data copying during the migration (switching system before copying) according to the embodiment of this invention.

FIG. 4 is an explanatory diagram of a system for switching an access path (access route) before data copying during migration (switching system before copying) according to the embodiment of this invention.

Before the migration is executed, an access path from the host 102 is set in the migration source volume 401. That is, access from the host 102 is executed for the migration source volume 401. The migration source volume 401 includes an area to which a WORM attribute has been assigned (update prohibition area 4012) and an area to which no WORM attribute has been assigned (update enable areas 4011 and 4013). In FIG. 4, a shaded portion is an area to which the WORM attribute has been assigned.

The host 102 can read data of all the areas of the migration source volume 401. The host 102 can also update data of the update enable areas 4011 and 4013. However, the host 102 cannot update data of the update prohibition area 4012. It is because the data of the update prohibition area 4012 is protected by the WORM function.

Upon the start of migration, the path management program 113 switches an access path from the host 102 to the migration destination volume 402 before a migration program (MP) 114 copies data. That is, the host 102 accesses the migration destination volume 402 thereafter.

The migration destination volume 402 of FIG. 4 corresponds to a state in which the data copying by the migration program 114 has not been completed. The migration destination volume 402 includes a copying completion update enable area 4021, a copying completion update prohibition area 4022, a copying incompletion update prohibition area 4023, and a copying incompletion update enable area 4024.

In the copying completion update enable area 4021, the host 102 can update data because a WORM attribute has not been assigned. However, since data copying has been completed, the migration program 114 cannot update data of the copying completion update enable area 4021.

In the copying completion update prohibition area 4022, the WORM attribute has been assigned, and data copying has been completed. Accordingly, neither of the host 102 and the migration program 114 can update data of the copying completion update prohibition area 4022.

In the copying incompletion update prohibition area 4023, the host 102 cannot update data because of the assigned WORM attribute. On the other hand, since data copying has not been completed, the migration program 114 can write data in the copying incompletion update prohibition area 4023 to complete the data copying.

In the copying incompletion update enable area 4024, no WORM attribute has been assigned, and data copying has not been completed. Accordingly, the host 102 and the migration program 114 can both write data in the copying incompletion update enable area 4024.

Upon completion of the data copying for the entire migration destination volume 402, the WORM attribute of the migration source volume 401 is released. As a result, data of the migration source volume 401 can be erased.

Figure 5:
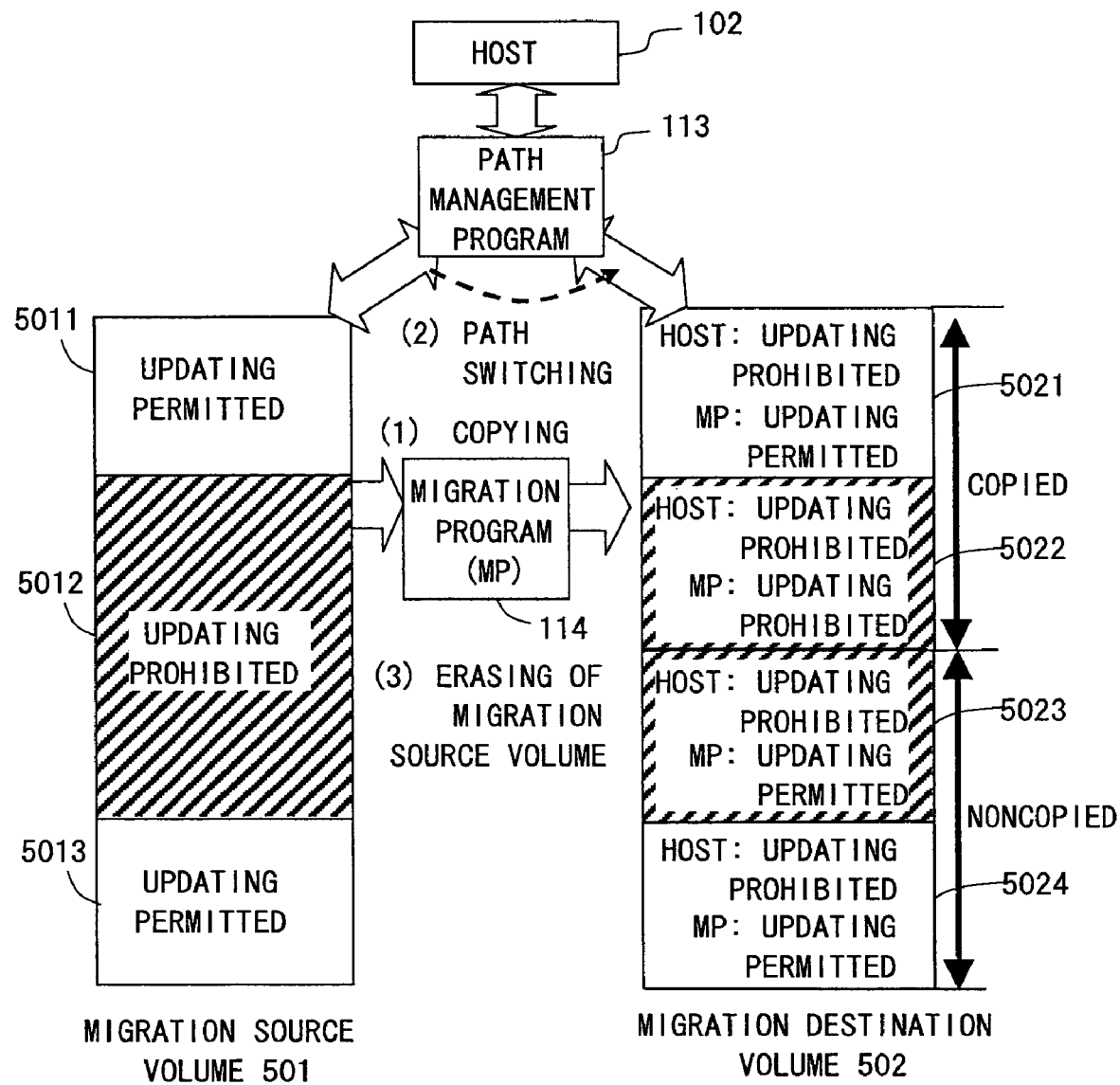
FIG. 5 is an explanatory diagram of a system for switching an access path after data copying during the migration (switching system after copying) according to the embodiment of this invention.

FIG. 5 is an explanatory diagram of a system for switching an access path after data copying during migration (switching system after copying) according to the embodiment of this invention.

Update enable areas 5011, 5013, and an update prohibition area 5012 that constitute a migration source volume 501 are equivalent to the update enable areas 4011, 4013, and the update prohibition area 4012 constituting the migration source volume 401 of FIG. 4. Additionally, control of access from the host 102 to the migration source volume 501 before the migration is executed is similar to that of FIG. 4.

In FIG. 5, upon the start of migration, the migration program 114 copies data of the migration source volume 501 to a migration destination volume 502. The path management program 113 does not switch an access path from the host 102 before the copying is completed. Thus, the host 102 accesses the migration source volume 501 before the completion of the copying.

The migration destination volume 502 of FIG. 5 corresponds to a state in which the data copying by the migration program (MP) 114 has not been completed. That is, the migration destination volume 502 includes a copying completion update enable area 5021, a copying completion update prohibition area 5022, a copying incompletion update prohibition area 5023, and a copying incompletion update enable area 5024.

Before the completion of the data copying, the host 102 cannot access the migration destination volume 502 because no switching of an access path from the host 102 is allowed. However, in the case of illegal switching of an access path, or in the case of illegal access from the host, data of the migration destination volume must be protected. Thus, data writing from the host 102 in the entire migration destination volume 502 is prohibited until the access path is switched.

In the copying completion update enable area 5021, data copying has been completed. However, because a WORM attribute has not been assigned, the host 102 may update data of the update enable area 5011 before the access path is switched. In such a case, the updated data must be copied again to the copying completion update enable area 5021. Thus, the migration program 114 can update data of the copying completion update enable area 5021.

In the copying completion update prohibition area 5022, data copying has been completed. Additionally, because of the assigned WORM attribute, data of the update prohibition area 5012 is not updated. Accordingly, the migration program 114 cannot update data of the copying completion update prohibition area 5022.

In the copying incompletion update prohibition area 5023, data copying has not been completed. Accordingly, the migration program 114 can write data in the copying incompletion update prohibition area 5023 to complete the data copying.

In the copying incompletion update enable area 5024, data copying has not been completed. Accordingly, the migration program 114 can write data in the copying incompletion update enable area 5024 to complete the data copying.

Next, description will be made of a specific configuration of the computer system of the embodiment of this invention which realizes the operations shown in FIGS. 4 and 5.

FIG. 6 is an explanatory diagram of a volume management table of one storage system according to the embodiment of this invention.

FIG. 6 shows contents of the volume management table 117a of the storage system 101a.

In FIG. 6, an internal LUN 601 is an identifier for uniquely identifying a logical volume present in the disk drive 107a. In an example of FIG. 6, there are five logical volumes in the disk drive 107a, to which internal LUNs 601 of "0" to "4" are assigned. Hereinafter, the logical volume whose internal LUN 601 is "0" will be referred to as a "logical volume 0". The logical volumes of the other internal LUNs 601 will be similarly described.

In the example of FIG. 6, the logical volumes 0, 1, 2, 3, and 4 correspond to a volume which is not a target of migration (not shown), the migration source volume 119, the migration destination volume 120, the migration source volume 201, and the migration source volume 301.

A capacity 602 indicates a data capacity of each logical volume.

An I/O control type 603 indicates whether a WORM attribute has been assigned to a part or all parts of the logical volume. In the example of FIG. 6, the I/O control type 603 of the logical volume 0 is "NORMAL". This means that no WORM attribute has been assigned to the logical volume 0. On the other hand, the I/O control type 603 of the logical volume 1 is "WORM". This means that a WORM attribute has been assigned to a part or all parts of the logical volume 1. WORM attributes have been assigned to the logical volumes 2 to 4 as in the case of the logical volume 1.

A WORM unit 604 indicates a unit by which a WORM attribute is assigned. In the example of FIG. 6, the WORM unit 604 of the logical volume 1 is "SECTOR". This means that the WORM attribute of the logical volume 1 has been assigned by sectors. That is, the WORM attribute has been assigned to sectors of a part of the logical volume 1, while WORM attributes may not be assigned to the remaining sectors. Additionally, WORM attributes may be assigned to all sectors of the logical volume 1. The WORM attributes have been assigned to the logical volumes 2 and 3 by sectors as in the case of the logical volume 1.

On the other hand, in the example of FIG. 6, the WORM unit 604 of the logical volume 4 is "VOLUME". This means that the WORM attribute has been assigned to all parts of the logical volume 4.

It should be noted that since no WORM attribute is assigned to the logical volume 0, the WORM unit 604 thereof is blank.

A migration state 605 indicates whether migration has been executed for each logical volume, and whether each logical volume is a data migration source or a data migration destination. In the example of FIG. 6, the migration state 605 of the logical volume 0 is "NONE", which means that no migration has been executed for the logical volume 0. On the other hand, the migration state 605 of the logical volume 1 is "MIGRATION SOURCE", which means that migration has been executed for the logical volume 1, and the logical volume 1 is a data migration source. Migration states 605 of the logical volumes 3 and 4 are similar to that of the logical volume 1.

Additionally, the migration state 605 of the logical volume 2 is "MIGRATION DESTINATION", which means that migration has been executed for the logical volume 2, and the logical volume 2 is a data migration destination.

In the case of a configuration in which the migration destination volume 302 is stored as the logical volume 4 in the storage system 101a, and the migration source volume 301 is stored in the storage system 101c, the migration state 605 of the logical volume 4 becomes "MIGRATION DESTINATION".

A migration pair LUN 606 indicates a logical volume which makes a pair with each logical volume in migration. In the example of FIG. 6, since no migration is executed for the logical volume 0, the migration pair LUN 606 thereof is blank.

On the other hand, the migration pair LUN 606 of the logical volume 1 is "INTERNAL LU (LUN=2)". This means that a logical volume making a pair with the logical volume 1 in migration is in the disk drive 107a, and its internal LUN is "2". That is, this means that the logical volume 2 makes a pair with the logical volume 1. Thus, the migration pair LUN 606 of the logical volume 2 is "INTERNAL LU (LUN=1)".

When the migration state 605 of the logical volume 1 is "MIGRATION SOURCE" and the migration state 605 of the logical volume 2 is "MIGRATION DESTINATION", the data of the logical volume 1 is copied to the logical volume 2.

The migration pair LUN 606 of the logical volume 3 is "STORAGE SYSTEM 101b (LUN=1)". This means that in the migration, the logical volume 3 makes a pair with the logical volume 1 in the storage system 101b connected to the storage system 101a through the SAN 104 and the LAN 105 (see FIG. 2). Since the migration state 605 of the logical volume 3 is "MIGRATION SOURCE", data thereof is copied to the logical volume 1 of the storage system 101b.

The migration pair LUN 606 of the logical volume 4 is "STORAGE SYSTEM 101c (LUN=3)". This means that in the migration, the logical volume 4 makes a pair with the logical volume 3 in the storage system 101c directly connected to the storage system 101a (see FIG. 3). Since the migration state 605 of the logical volume 4 is "MIGRATION SOURCE", data thereof is copied to the logical volume 3 of the storage system 101c.

When the migration state 605 of the logical volume 4 is "MIGRATION DESTINATION", the data of the logical volume 3 of the storage system 101c is copied to the logical volume 4 of the storage system 101a.

Path switching 607 indicates a setting state of an access path from the host. In the example of FIG. 6, since no migration is executed for the logical volume 0, the path switching 607 of the logical volume 0 is blank.

The path switching 607 of the logical volume 1 and the logical volume 2 making a pair therewith is "UNDONE". This means that an access path from the host has not been switched to the logical volume of the migration destination (i.e., logical volume 2). That is, the access path from the host has been set in the logical volume of the migration source (i.e., logical volume 1). Thus, when an access request (data writing or reading request) is made by the host 102 at the present moment, access is made to the logical volume 1.

The path switching 607 of the logical volume 3 is "UNDONE". This means that an access path from the host has not been switched to the logical volume of the migration destination (i.e., logical volume 1 of the storage system 101b). That is, the access path from the host has been set in the logical volume of the migration source (i.e., logical volume 3). Thus, when an access request is made by the host 102 at the present moment, access is made to the logical volume 3.

The path switching 607 of the logical volume 4 is "DONE". This means that an access path from the host has been switched to the logical volume of the migration destination (i.e., logical volume 3 of the storage system 101c). That is, the access path from the host has been set in the logical volume of the migration destination. Thus, when an access request is made by the host 102 at the present moment, access is made to the logical volume 3 of the storage system 101c.

A WORM attribute 608 indicates a WORM attribute assigned to each logical volume. Specifically, the WORM attribute 608 is a pointer of information (WORM attribute tables 6091 to 6093) which indicates a WORM attribute assigned to each logical volume.

The WORM attribute tables 6091 to 6093 are contained in the volume management table 117a, and contain information concerning a WORM attribute assigned to each logical volume. Referring to FIG. 7, the WORM attribute tables will be described in detail.

As described above, since there is no WORM attribute assigned to the logical volume 0, the WORM attribute 608 thereof is blank.

The WORM attribute 608 of the logical volume 1 corresponds to a WORM attribute table (1) 6091. That is, the WORM attribute table (1) 6091 contains information on a WORM attribute assigned to the logical volume 1.

Since the logical volume 2 is a data migration destination of the logical volume 1, a WORM attribute identical to that of the logical volume 1 is assigned thereto. Thus, the WORM attribute 608 of the logical volume 2 corresponds to the WORM attribute table (1) 6091.

Similarly, the WORM attribute 608 of the logical volume 3 corresponds to a WORM attribute table (2) 6092, and the WORM attribute 608 of the logical volume 4 corresponds to a WORM attribute table (3) 6093.

The aforementioned contents of the volume management table 117a may be set by the management terminal 103 through the LAN 105, or by the host 102 through the SAN 104.

FIG. 7 is an explanatory diagram of the WORM attribute table according to the embodiment of this invention.

As an example of a WORM attribute table, FIG. 7 shows contents of the WORM attribute table (1) 6091. The WORM attribute table (1) 6091 contains a WORM sector range table 701 and a history table 704.

The WORM sector range table 701 indicates a sector to which the WORM attribute of the logical volume 1 has been assigned. A WORM area in the WORM sector range table 701 is an update prohibition area to which the WORM attribute has been assigned. That is, the host 102 cannot update data of a sector in the WORM area. A start address 702 is an address of a head sector of each WORM area. An end address 703 is an address of an end sector of each WORM area. For example, a WORM area 1 covers a range of a sector of a 50-th address to a sector of a 100-th address. Thus, the host 102 cannot update data of the sectors of addresses in this range.

It should be noted that the WORM sector range table 701 may be a bitmap which includes a flag indicating presence of a WORM attribute for each sector.

The history table 704 indicates past migration history of the logical volume 1.

In FIG. 7, a date 705 and a time 706 indicate a date and a time when creation of a new logical volume or the like is executed. A device 707 and a LUN 708 indicate an identifier of a device and an identifier of a logical volume in which creation of a new logical volume or the like has been executed. A state 709 indicates a state of a logical volume (e.g., new creation, migration start, or the like).

In the example of FIG. 7, the logical volume 1 was newly created as the logical volume 0 by a device "ZZZ" (e.g., one of the storage system 101) at 0:11:22 on Apr. 26, 2004. Subsequently, migration was started from this logical volume to the logical volume 3 of the device "ZZZ" at 11:33:22 on May 28, 2004, and the migration was finished at 13:33:12 on May 28, 2004. Further, migration was started from this logical volume to the logical volume 1 of a device "AAA" (e.g., storage system 101a) at 4:22:32 on Jun. 25, 2004, and the migration was finished at 6:02:30 on Jun. 25, 2004.

The host 102 can know a logical volume in which data to be obtained is currently present by referring to the history table 704.

Further, it is proved by the history table 704 that data stored in a given device has been moved to another device and surely saved.

The WORM attribute table (2) 6092 of the logical volume 3 and the WORM attribute table (3) 6093 of the logical volume 4 contain WORM sector range tables and history tables (not shown) as in the case of the WORM attribute table (1) 6091. Contents thereof are set as in the cases of the WORM sector range table 701 and the history table 704, and thus description will be omitted.

When a logical volume of a migration destination is in the other storage system, the WORM attribute table is copied to the volume management table 117 thereof. For example, a migration destination of the logical volume 3 is the storage system 101b. Accordingly, the WORM attribute table (2) 6092 is copied to the volume management table 117b of the storage system 101b. Additionally, a migration destination of the logical volume 4 is the storage system 101c. Thus, the WORM attribute table (3) 6093 is copied to the volume management table 117c of the storage system 101c.

By copying the WORM attribute table as described above, it is possible to protect the data to which the WORM attribute has been assigned even during the migration.

Figure 8:
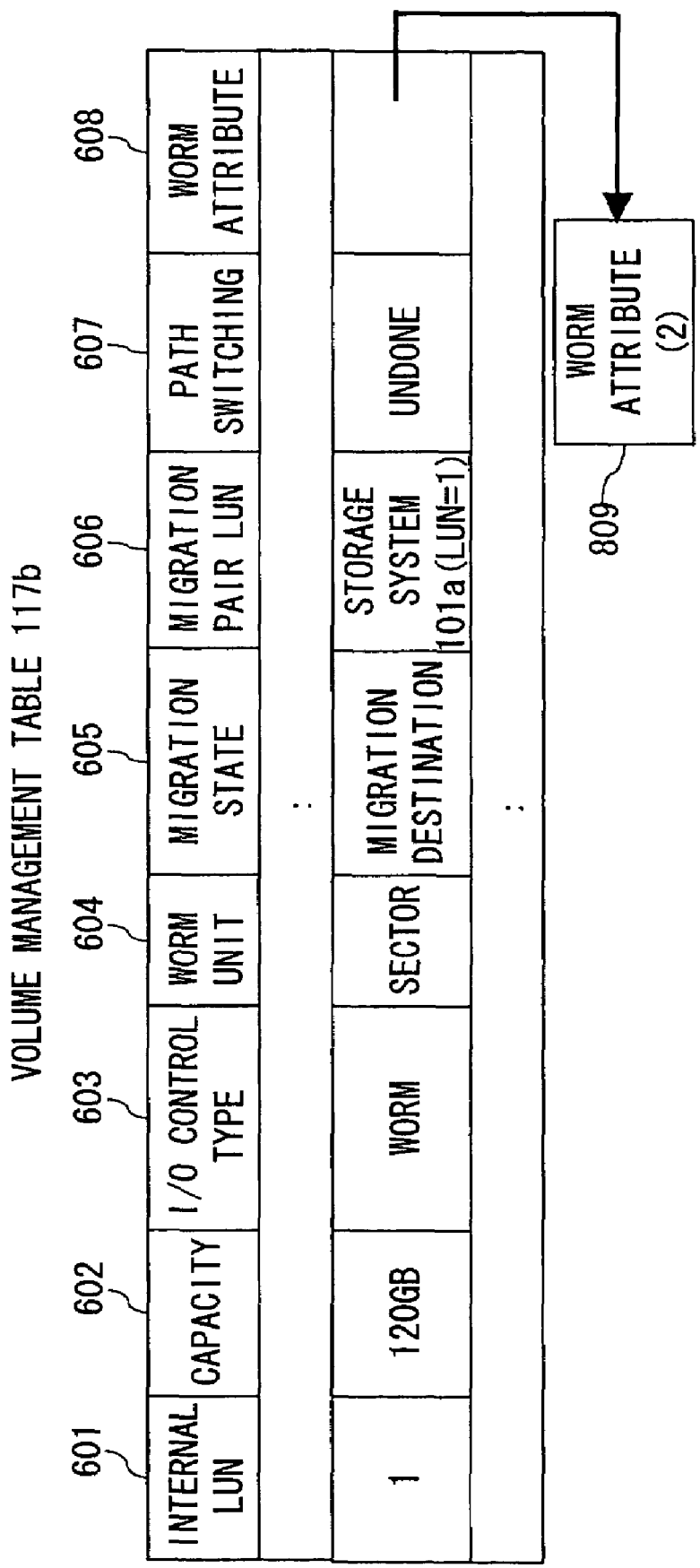
FIG. 8 is an explanatory diagram of a volume management table of another storage system according to the embodiment of this invention.

FIG. 8 is an explanatory diagram of a volume management table of another storage system according to the embodiment of this invention.

FIG. 8 shows contents of the volume management table 117b of the storage system 101b.

Detailed description of portions of FIG. 8 similar to those of the volume management table 117a of FIG. 6 will be omitted.

The logical volume 1 of FIG. 8 is a migration destination of the logical volume 3 of FIG. 6. That is, the logical volume 1 corresponds to the migration destination volume 202 of FIG. 2. Accordingly, the capacity 602, the I/O control type 603, the WORM unit 604, and the switching path 607 are similar to those of the logical volume 3 of FIG. 6. The migration state 605 is "MIGRATION DESTINATION", and the migration pair LUN 606 is "STORAGE SYSTEM 101a (LUN=3)". Further, the WORM attribute 608 corresponds to a WORM attribute table (2) 809. The WORM attribute table (2) 809 is a copy of the WORM attribute table (2) 6092 of FIG. 6.

Figure 9:
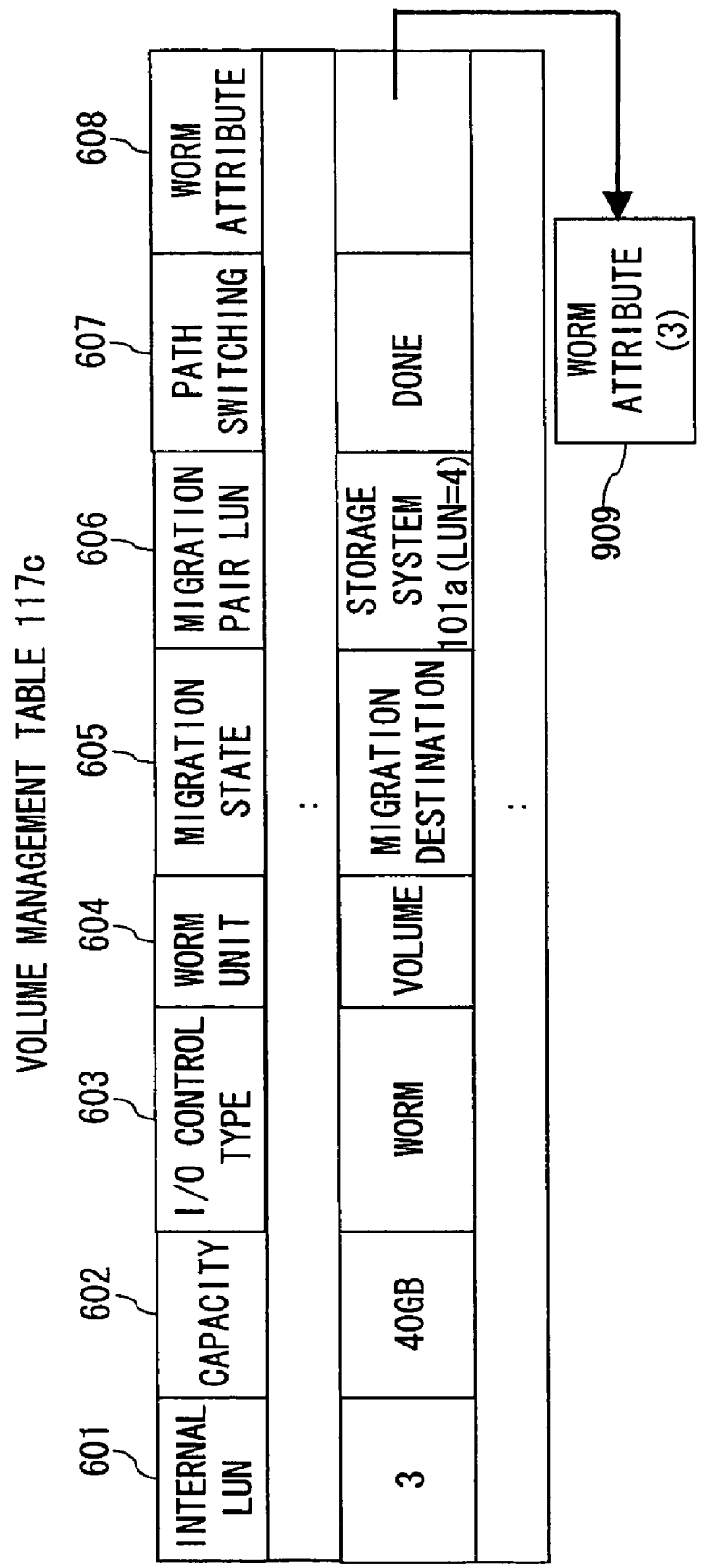
FIG. 9 is an explanatory diagram of a volume management table of still another storage system according to the embodiment of this invention.

FIG. 9 is an explanatory diagram of a volume management table of still another storage system according to the embodiment of this invention.

FIG. 9 shows contents of the volume management table 117c of the storage system 101c.

Detailed description of portions of FIG. 9 similar to those of the volume management table 117a of FIG. 6 will be omitted.

The logical volume 3 of FIG. 9 is a migration destination of the logical volume 4 of FIG. 6. That is, the logical volume 3 corresponds to the migration destination volume 302 of FIG. 3. Accordingly, the capacity 602, the I/O control type 603, the WORM unit 604, and switching path 607 are similar to those of the logical volume 4 of FIG. 6. The migration state 605 is "MIGRATION DESTINATION", and the migration pair LUN 606 is "STORAGE SYSTEM 101a (LUN=4)". Further, the WORM attribute 608 corresponds to a WORM attribute table (3) 909. The WORM attribute table (3) 909 is a copy of the WORM attribute table (3) 6093 of FIG. 6.

When the logical volume 3 of FIG. 9 is a migration source of the logical volume 4 of FIG. 6, the migration state 605 becomes "MIGRATION SOURCE".

Figure 10:
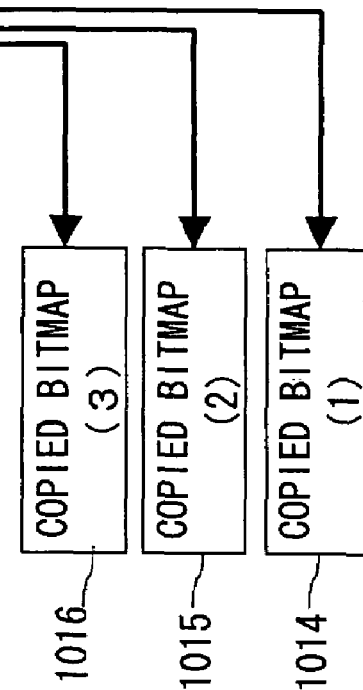
FIG. 10 is an explanatory diagram of a path management table according to the embodiment of this invention.

FIG. 10 is an explanatory diagram of a path management table according to the embodiment of this invention.

For the logical volumes in the middle of migration, a logical volume of a migration source and a logical volume of a migration destination constitute a migration pair. The host 102 recognizes one migration pair as one logical volume. Thus, when there is access from the host 102 to the logical volumes in the middle of migration, it is necessary to select one of the logical volumes in which an access path is to be set.

When there is access from the host 102, a path management program 112 refers to the path management table 118 to select an access path, and switches to the selected access path. In the path management table 118, information necessary for the path management program 112 to select an access path is stored.

However, when the migration source volume 201 and the migration destination volume 202 are included in the different storage systems 101, and the storage systems 101 are connected to the host 102 as shown in FIG. 2, the path management program 113 in the storage system 101 cannot switch the access path from the host 102. Thus, the host 102b includes a host-based path management program 203 equipped with a function similar to that of the path management program 113, and a host-based path management table 204 containing information similar to that of the path management table 118.

FIG. 10 shows contents of the path management table 118a of the storage system 101a. The path management tables 118b, 118c, and the host-based path management table 204 contain contents similar to those of FIG. 10.

In FIG. 10, one line corresponds to one migration pair. However, concerning a logical volume for which no migration has been executed, one line corresponds to one logical volume.

In an example of FIG. 10, a line 1010 corresponds to the logical volume 0 (not shown) of the storage system 101a. A line 1011 corresponds to a migration pair which includes the logical volume 1 and the logical volume 2 of the storage system 101a (i.e., migration source volume 119 and migration destination volume 120). A line 1012 corresponds to a migration pair which includes the logical volume 3 of the storage system 101a and the logical volume 1 of the storage system 101b (i.e., migration source volume 201 and migration destination volume 202). A line 1013 corresponds to a migration pair which includes the logical volume 4 of the storage system 101a and the logical volume 3 of the storage system 101c (i.e., migration source volume 301 and migration destination volume 302).

In FIG. 10, a port number 1001 identifies an I/F 111 which receives access from the host 102.

A host ID 1002 is an identifier of the host 102 which accesses a logical volume (or migration pair) corresponding to each line. In the example of FIG. 10, identifiers "AAA", "BBB", and "CCC" are identifiers of the hosts 102a, 102b, and 102c.

A host LUN 1003 is an identifier of each logical volume recognized by the host 102. However, two logical volumes that constitute a migration pair are recognized as one logical volume by the host. Accordingly, one host LUN is assigned to one migration pair. Additionally, the host 102 only needs to uniquely identify a logical volume (or migration pair) which it accesses. Thus, the same host LUN 1003 may be assigned to a logical volume (or migration pair) accessed by another host 102.

An internal LUN 1004 is an identifier which uniquely identifies each logical volume (or migration pair) in the storage system 101a.

A migration state 1005 indicates whether each logical volume (or migration pair) is in the middle of migration. A logical volume (or migration pair) whose migration state 1005 is "o" is in the middle of migration.

A migration source 1006 indicates a location and an identifier of a migration source logical volume of the migration pair.

A migration destination 1007 indicates a location and an identifier of a migration destination logical volume of the migration pair.

Path switching 1008 indicates whether an access path from the host 102 has been switched for each migration pair. An access path of a migration pair whose switching path 1008 is "UNDONE" is set in the migration source logical volume, and an access path of a migration pair whose path switching 1008 is "DONE" is set in the migration destination logical volume.

A progression degree 1009 indicates a degree of progression of migration. Specifically, the progression degree 1009 is a pointer of a copied bitmap.

Each of copied bitmaps 1014 to 1016 includes a copied flag indicating whether copying of a sector of a logical volume has been finished. This flag may be set for each sector. In such a case, however, data amounts of the copied bitmaps 1014 to 1016 increase. Thus, one copied flag may be set for a plurality of sectors. Hereinafter, a plurality of sectors corresponding to one copied flag will be referred to as a "migration block". For example, 128 sectors may constitute one migration block. In this case, when a capacity of one sector is 0.5 KB (kilobyte), a data amount of one migration group is 64 KB.

Pieces of data of the migration source volume are sequentially copied to the migration destination volume. Before the start of the copying, values of all the copied flags of the copied bitmaps 1014 to 1016 indicate "NONCOPIED". After copying of data of one migration block is finished, a copied flag corresponding to the migration block is changed to a value indicating "COPIED".

When all the copied flags of the copied bitmaps 1014 to 1016 become "COPIED", the copying of all the data from the migration source volume to the migration destination volume is finished.

It should be noted that in the case of a configuration in which the migration destination volume 302 is stored as the logical volume 4 in the storage system 101a, and the migration source volume 301 is stored as the logical volume 3 in the storage system 101c, the migration source 1006 of the line 1013 becomes "STORAGE SYSTEM 101c (LUN=3)", and the migration destination 1007 becomes "INTERNAL LU (LUN=4)".

Next, description will be made of operations of the sections of the computer systems of the embodiments of this invention shown in FIGS. 1 to 3. The operations of the computer systems shown in FIGS. 1 to 3 are basically similar, but some sections have unique operations. Hereinafter, similar operations will be described and, when unique operations are explained, it will be clearly specified.

Figure 11:
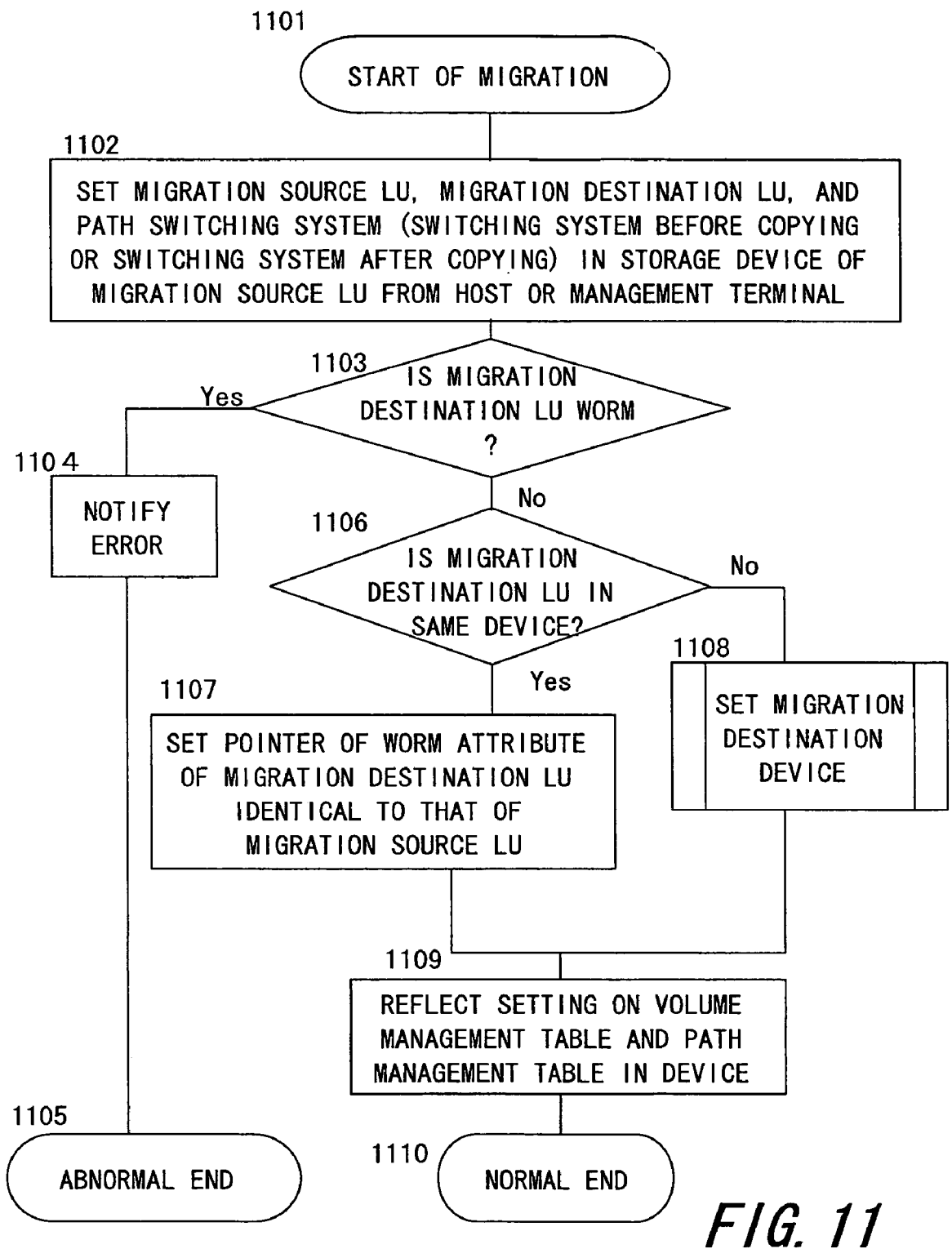
FIG. 11 is a flowchart showing a process of starting the migration in the computer system of the embodiment of this invention.

FIG. 11 is a flowchart showing a process of starting migration in the computer system of the embodiment of this invention.

FIG. 11 shows a process executed in the case of migration of a logical volume in the storage system 101a to another logical volume therein or a logical volume in another storage system.

Upon the start of the migration process (1101), the host 102 or the management terminal 103 sets a location and an identifier of a migration source logical volume, a location and an identifier of a migration destination logical volume, and a path switching system for the configuration management program 115a of the storage system 101a which includes a migration source logical volume (LU) (1102). Here, the path switching system is one of the switching system before copying described above with reference to FIG. 4 and the switching system after copying described above with reference to FIG. 5.

Next, the configuration management program 115a checks whether the set migration destination volume includes a sector to which a WORM attribute has been assigned (1103). If the migration destination volume includes the sector to which the WORM attribute has been assigned, data of the sector cannot be updated. Consequently, migration cannot be executed for the migration destination volume. Thus, the configuration management program 115a notifies the host 102 or the management terminal 103 that the migration cannot be executed (1104). Then, the process of starting the migration comes to an abnormal end (1105).

On the other hand, if the migration destination volume includes no sector to which the WORM attribute has been assigned, the data of the migration destination volume can be updated. Accordingly, migration can be executed for the migration destination volume. Thus, the configuration management program 115a next determines whether the migration destination logical volume is a logical volume in the same storage system 101a (1106).

If the migration destination logical volume is a logical volume in the same storage system 101a, the configuration management program 115a makes setting of the WORM attribute 608 of the migration destination volume of the volume management table 117a identical to that of the migration source volume (1107). This is equivalent to the case of FIG. 1. In the example of FIG. 6, the WORM attribute 608 of the logical volume 2 is set as a pointer of the WORM attribute table (1) 6091. As a result, the WORM attribute table of the logical volume 2 becomes identical to that of the logical volume 1.

Figure 12:
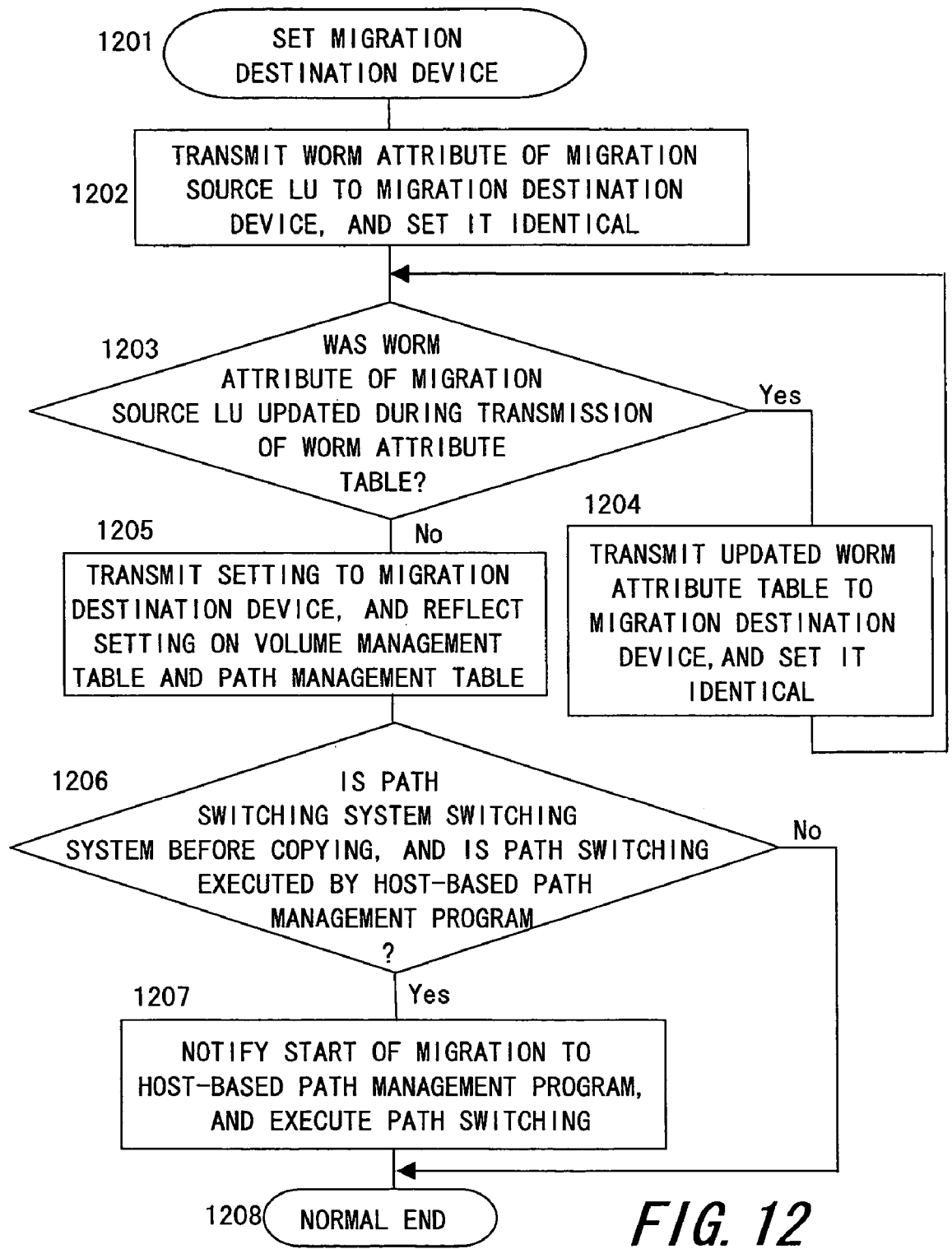
FIG. 12 is a flowchart showing a process of setting a migration destination device in the computer system of the embodiment of this invention.

On the other hand, if the migration destination logical volume is not a logical volume in the same storage system 101a, the configuration management program 115a sets the storage system 101 which includes the migration destination volume (1108). This is equivalent to the case of FIG. 2 or 3. Referring to FIG. 12, this setting will be described in detail.

Next, the configuration management program 115a reflects the setting in step 1102 in the volume management table 117a and the path management table 118a (1109).

Then, the process of starting the migration comes to a normal end (1110).

FIG. 12 is a flowchart showing a process of setting a migration destination device (storage system) in the computer system of the embodiment of this invention.

The process of setting the migration destination device is called from step 1108 of FIG. 11. Upon the start of the process of setting the migration destination device (1201), to make a WORM attribute of the migration destination volume identical to that of the migration source volume, the configuration management program 115a transmits a WORM attribute table of the migration source volume to the storage system 101 which includes the migration destination volume (1202).

Next, determination is made as to whether the WORM attribute table of the migration source volume has been updated during the execution of step 1202 (1203). If the WORM attribute table of the migration source volume has been updated during the execution of step 1202, the WORM attribute table of the migration source volume and the WORM attribute of the migration destination volume are not identical to each other, and thus the updated WORM attribute table is transmitted to the storage system 101 of the migration destination (1204).

If the WORM attribute table of the migration destination volume is not updated during the execution of step 1202, the WORM attribute table of the migration source volume and the WORM attribute of the migration destination volume become identical to each other. Accordingly, to reflect the setting of step 1102 in the volume management table 117 and the path management table 118, the configuration management program 115a transmits this setting to the storage system 101 of the migration destination (1205).

Next, determination is made as to whether a path switching system of migration to be executed is a switching system before copying, and whether the host-based path management program 203 executes access path switching (1206). As a result, if the path switching system is a switching system after copying or the path management program 113 executes access path switching, the process of setting the migration destination device comes to a normal end (1208). This is equivalent to the case of FIG. 3 or the case of applying the switching system after copying in FIG. 2.

On the other hand, if the path switching system is a switching system before copying, and the host-based path management program 203 executes access path switching, the configuration management program 115a notifies a start of migration to the host-based path management program 203, and executes path switching (1207). This is equivalent to the case of applying the switching system before copying in FIG. 2.

Then, the process of setting the migration destination device comes to a normal end (1208).

Figure 13:
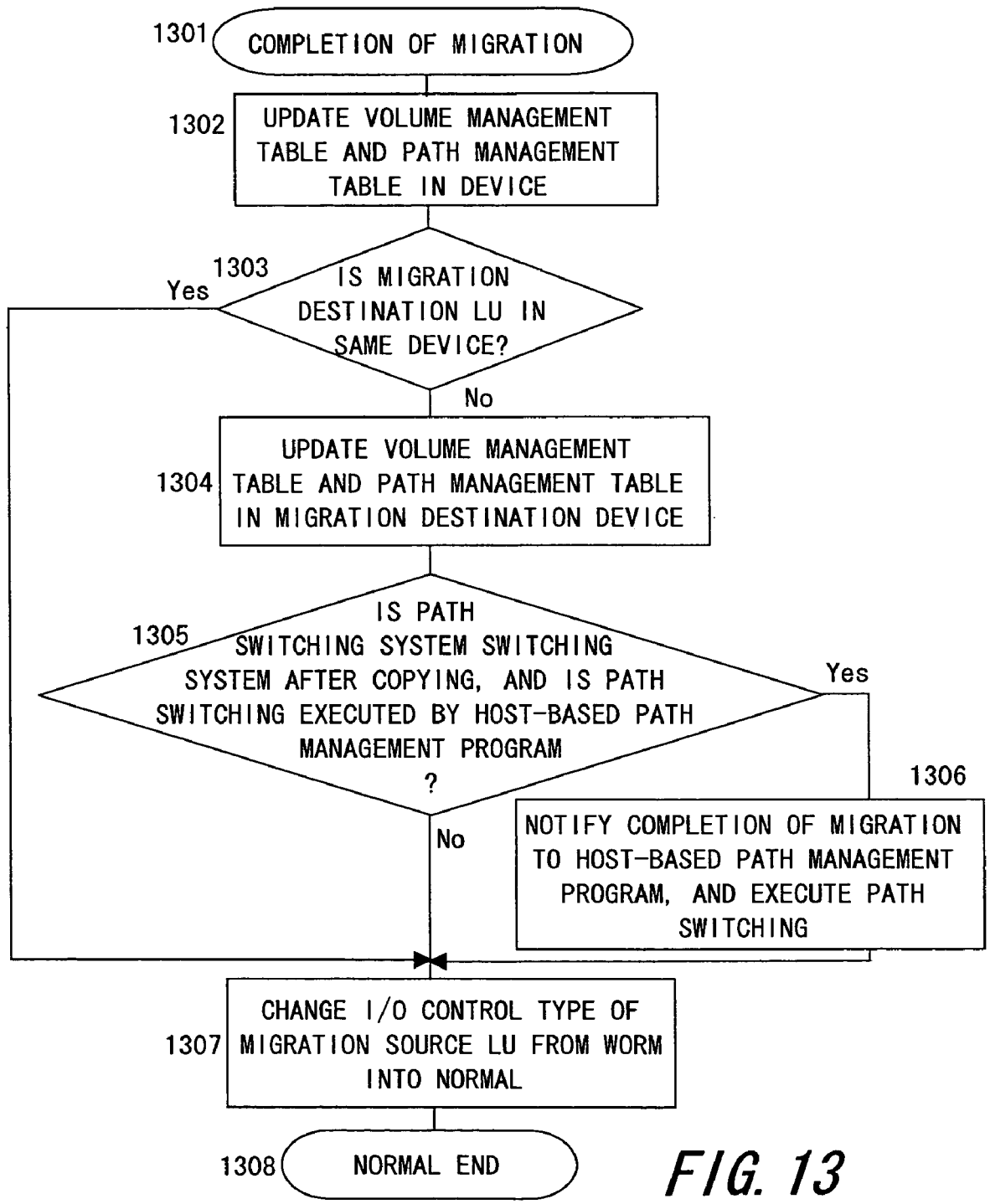
FIG. 13 is a flowchart showing a process of completing the migration in the computer system of the embodiment of this invention.

FIG. 13 is a flowchart showing a process of completing migration in the computer system of the embodiment of this invention.

The process of completing the migration is executed when copying of all the data from the migration source volume to the migration destination volume is finished.

FIG. 13 shows an exemplary process executed when copying of data from a logical volume in the storage system 101a to another logical volume therein or a logical volume in another storage system is finished.

Upon the start of the process of completing migration (1301), the configuration management program 115a updates the volume management table 117a and the path management table 118a (1302). Specifically, the migration state 605 of the logical volume for which the copying has been finished is changed to "NONE", and the migration pair LUN 606 and the path switching 607 are left blank. Further, a migration state 1005 of the migration pair for which the copying has been finished is changed to "x (cross)", and a migration source 1006, a migration destination 1007, and path switching 1008 are left blank.

Next, the configuration management program 115a determines whether the migration destination volume is in the same storage system 101a (1303).

If the migration destination volume is in the same storage system 101a, the process proceeds to step 1307. This is equivalent to the case of FIG. 1.

On the other hand, if the migration destination volume is not in the same storage system 101a, the configuration management program 115 of the storage system 101 which includes the migration destination volume updates the volume management table 117 and the path management table 118 as in the case of step 1302 (1304).

Further, the configuration management program 115a determines whether the path switching system is a switching system after copying, and whether the host-based path management program 203 executes path switching (1305). If the path switching system is a switching system before copying, or the path management program 113 executes path switching, the process proceeds to step 1307. This is equivalent to the case of FIG. 3 or the case in which the switching system before copying is applied in FIG. 2.

On the other hand, if the path switching system is a switching system after copying, and the host-based path management program 203 executes path switching, the configuration management program 115a notifies the completion of migration to the host-based path management program 203. This is equivalent to the case of applying the switching system after copying in FIG. 2. The host-based path management program 203 executes path switching (1306).

Next, the configuration management program 115a changes the I/O control type 603 of the volume management table 117a corresponding to the migration source volume to "NORMAL" (1307). As a result, the WORM attribute of the migration source volume is released (1308). Subsequently, the host 102 can update data of the migration source volume. The host 102 may erase the migration source volume, or reuse it as a new logical volume.

Figure 14:
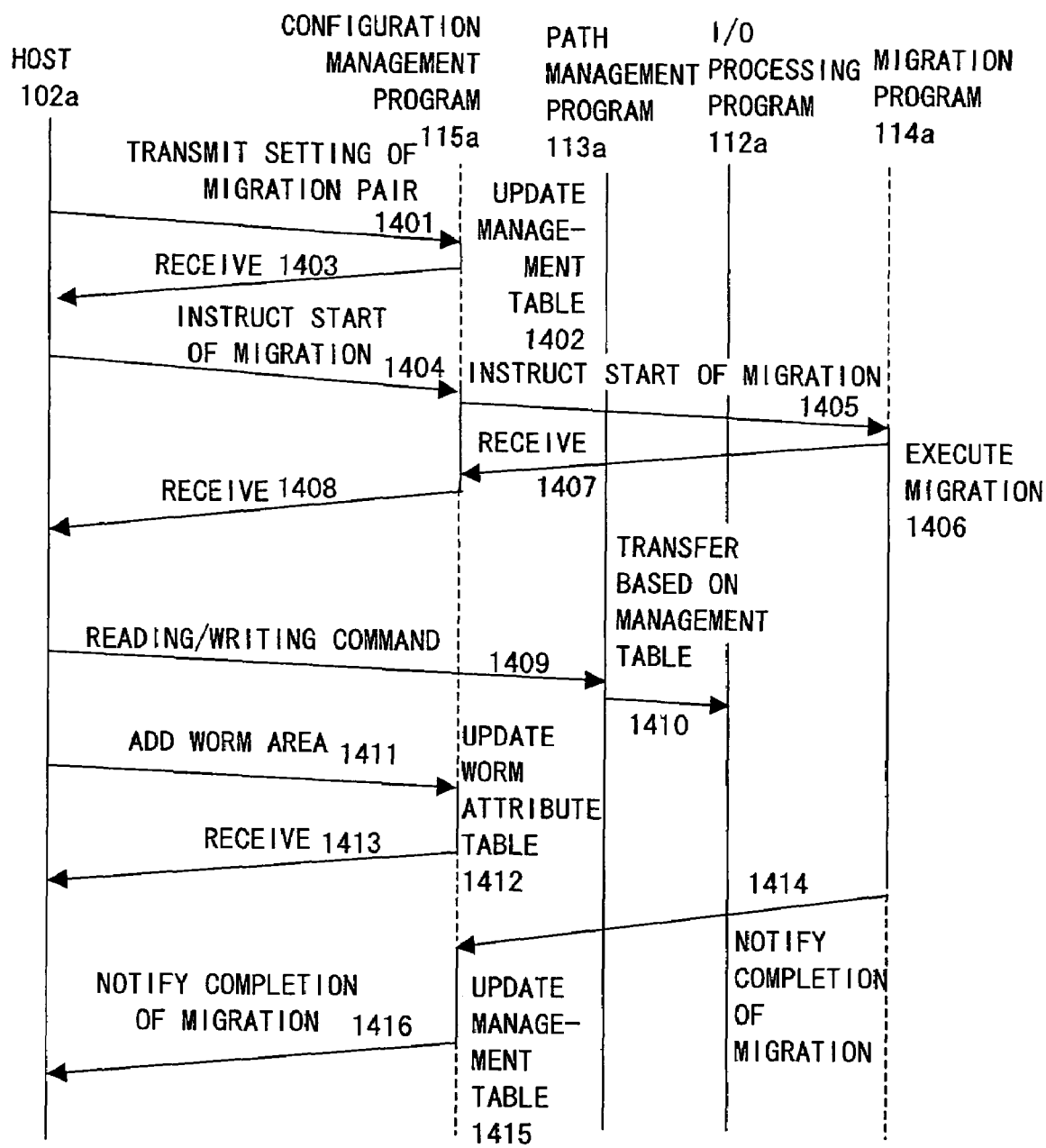
FIG. 14 is a sequence diagram of commands transferred between a host and programs when migration is executed in the same storage system in the computer system of the embodiment of this invention.

FIG. 14 is a sequence diagram of commands transferred between the host and programs when migration is executed in the same storage system in the computer system of the embodiment of this invention.

FIG. 14 shows an exemplary case in which the host 102a instructs migration from the migration source volume 119 to the migration destination volume 120 in the storage system 101a (see FIG. 1).

First, the host 102a transmits a command to set a migration pair to the configuration management program 115a (1401). According to the received command, the configuration management program 115a sets the volume management table 117a and the path management table 118a (1402). Specifically, the configuration management program 115a executes the process of starting migration (see FIG. 11). When the process of starting the migration comes to a normal end, the configuration management program 115a transmits a notification that the setting of the migration pair has been received to the host 102a (1403).

Next, the host 102a transmits a command to start migration to the configuration management program 115a (1404). The configuration management program 115a transmits the received command to the migration program 114a (1405). The migration program 114a starts the migration (1406), and transmits a notification that the command to start the migration has been received to the configuration management program 115a (1407). The configuration management program 115a transmits the received notification to the host 102a (1408).

The migration program 114a refers to the copied bitmap 1014. At a point of time when copying is started, all the copied flags contained in the copied bitmap 1014 are "NON-COPIED". The migration program 114a copies data of a migration block whose copied flag is "NONCOPIED" (i.e., migration block for which copying has not been finished) from the migration source volume 119 to the migration source volume 120. The copied flag of the migration block for which the copying has been finished is updated to "COPIED". The migration program 114a cannot update the data of the migration block whose copied flag is "COPIED".

When all the copied flags of the copied bitmap 1014 become "COPIED", the migration program 114a finishes the migration.

When the host 102a transmits a reading or writing command during the migration executed by the migration program 114a (1409), the path management program 113a receives the command. The path management program 113a refers to the path management table 118a to set an access path, and transmits the received command to the I/O processing program 112a (1410). Specifically, the path management program 113a sets an access path in the migration source volume if the path switching 1008 of the path management table 118a (see FIG. 10) is "UNDONE", and in the migration destination volume if the path switching 1008 is "DONE".

The I/O processing program 112a processes the reading or writing command from the host 102a according to the set access path. That is, the I/O processing program 112a executes data reading or writing for the logical volume in which the access path has been set. However, the I/O processing program 112a refers to the WORM attribute table 6091 (see FIG. 6), and does not update data in an area to which the WORM attribute has been assigned.

When the host 102a transmits a command to update the WORM attribute table 6091 (e.g., addition of new WORM area) during the migration executed by the migration program 114a (1411), the configuration management program 115a receives the command. According to the received command, the configuration management program 115a updates the WORM attribute table 6091 (1412). Upon the end of the updating, the configuration management program 115a transmits a notification that the updating of the WORM attribute table 6091 has been completed to the host 102a (1413).

Upon the end of the migration, the migration program 114a transmits a migration completion notification to the configuration management program 115a (1414). The configuration management program 115a that has received the migration completion notification updates the management table (1415). Specifically, the configuration management program 115a executes the process of completing migration (see FIG. 13). When the process of completing the migration comes to a normal end, the configuration management program 115a transmits the migration completion notification to the host 102a (1416).

Figure 15:
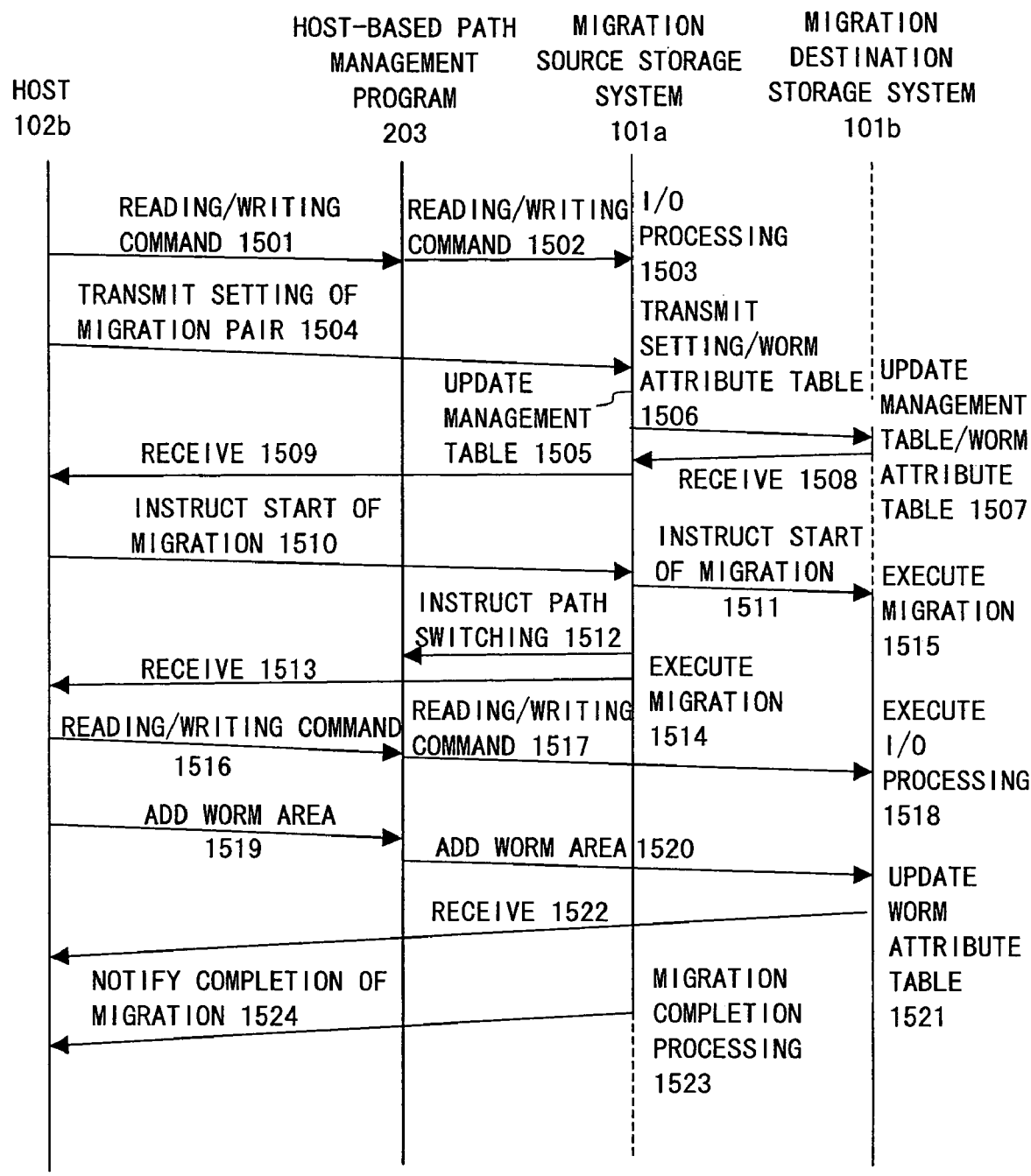
FIG. 15 is a sequence diagram of commands transferred between a host and the storage systems when migration to which the switching system before copying is applied is executed between the storage systems interconnected through a SAN in the computer system of the embodiment of this invention.

FIG. 15 is a sequence diagram of commands transferred between the host and the storage systems when migration to which the switching system before copying (FIG. 4) is applied is executed between the storage systems interconnected through the SAN in the computer system of the embodiment of this invention.

FIG. 15 shows, as an example, a case in which the host 102b instructs migration from the migration source volume 201 in the storage system 101a to the migration destination volume 202 in the storage system 101b (see FIG. 2).

When executing data reading or writing before the migration is started, the host 102b transmits a reading or writing command to the host-based path management program 203 in the host 102b (1501).

The host-based path management program 203 refers to the host-based path management table 204 to set an access path. Specifically, since migration is not started at this time, the host-based path management program 203 sets an access path in the storage system 101a of the migration source. Then, the host-based management program 203 transmits a reading or writing command to the storage system 101a of the migration source (1502). According to the received command, the storage system 101a executes data reading or writing (input/output) (1503). However, the storage system 101a does not update data in an area to which the WORM attribute has been assigned.

At the time of starting the migration, the host 102b first transmits a command to set a migration pair to the storage system 101a of the migration source (1504). According to the received command, the storage system 101a updates the volume management table 117a and the path management table 118a (1505). Additionally, the storage system 101a transmits the received command and the WORM attribute table contained in the volume management table 117a to the storage system 101b of the migration destination (1506).

Specifically, the configuration management program 115a of the storage system 101a executes the process of starting the migration (see FIG. 11), and executes the process of setting the migration destination device in step 1108 (see FIG. 12).

According to the received command and the WORM attribute table, the storage system 101b updates the volume management table 117b and the path management table 118b (1507). Upon the end of updating, the storage system 101b notifies the storage system 101a that the command to set the migration pair has been received (1508).

The storage system 101a notifies the host 102b that the command to set the migration pair has been received (1509).

Further, the host 102b sets the host-based path management table 204 as in the case of the path management tables 118a and 118b.

Next, the host 102b transmits a command to start migration to the storage system 101a (1510). The storage system 101a transmits the received command to the storage system 101b (1511). Additionally, the storage system 101a transmits a path switching command to the host-based path management program 203 (1512). This path switching command instructs resetting of the access path which has been set between the host 102b and the storage system 101a between the host 102b and the storage system 101b. Then, the storage system 101a notifies the host 102b that the command to start the migration has been received (1513).

Upon the reception of the command to start the migration, the storage systems 101a and 101b start migration (1514, 1515). Specifically, the migration programs 114a and 114b copy data of the migration source volume 201 to the migration destination volume 202. In this case, as described above with reference to FIG. 14, the migration programs 114a and 114b refer to the copied bitmap 1015.

When the host 102b transmits a reading or writing command during the migration executed by the storage systems 101a and 101b (1516), the host-based path management program 203 receives the command. Since the host-based path management program 203 has received the path switching command (1512), it has set an access path from the host 102b in the storage system 101b of the migration destination. Thus, the host-based path management program 203 transmits the received reading or writing command to the storage system 101b (1517).

According to the received reading or writing command, the storage system 101b executes data reading or writing (input/output) (1518). However, the storage system 101b does not update data in an area to which the WORM attribute has been assigned.

When the host 102b transmits a command to add a new WORM area during the migration executed by the storage systems 101a and 101b (1519), the host-based path management program 203 receives the command. The host-based path management program 203 transmits the received command to the storage system 101b (1520). According to the received command, the storage system 101b updates the WORM attribute table 6092 (1521). Upon the end of the updating, the storage system 101b transmits a notification that the WORM area has been added to the host 102b (1522).

Upon the end of the migration (1514, 1515), the storage system 101a executes a process of completing migration (FIG. 13) (1523). As a result, the volume management tables 117a, 117b and the path management tables 118a, 118b are updated.

When the process of completing the migration 1523 comes to a normal end, the storage system 101a transmits a migration completion notification to the host 102b (1524).

Figure 16:
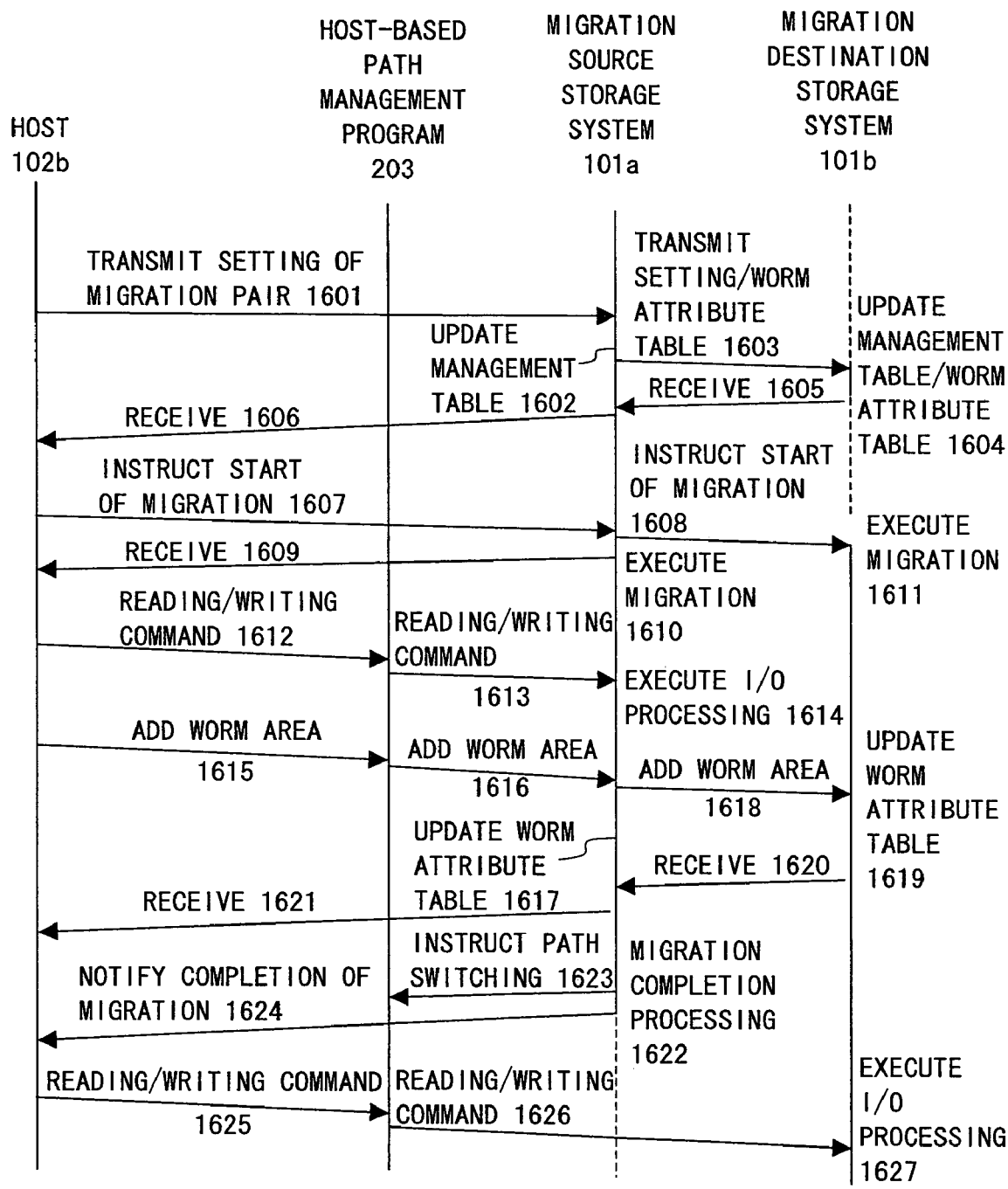
FIG. 16 is a sequence diagram of commands transferred between the host and the storage systems when migration to which the switching system after copying is applied is executed between the storage systems interconnected through the SAN in the computer system of the embodiment of this invention.

FIG. 16 is a sequence diagram of commands transferred between the host and the storage systems when migration to which the switching system after copying (FIG. 5) is applied is executed between the storage systems interconnected through the SAN in the computer system of the embodiment of this invention.

As in the case of FIG. 15, FIG. 16 shows a case in which the host 102b instructs migration from the migration source volume 201 in the storage system 101a to the migration destination volume 202 in the storage system 101b (see FIG. 2). Detailed description of portions of FIG. 16 similar to those of FIG. 15 will be omitted.

At the time of starting the migration, the host 102b first transmits a command to set a migration pair to the storage system 101a of the migration source (1601). According to the received command, the storage system 101a updates the volume management table 117a and the path management table 118a (1602). Additionally, the storage system 101a transmits the received command and the WORM attribute table contained in the volume management table 117a to the storage system 101b of the migration destination (1603).

Specifically, the configuration management program 115a of the storage system 101a executes the process of starting the migration (see FIG. 11), and executes the process of setting the migration destination device in step 1108 (see FIG. 12).

According to the received command and the WORM attribute table, the storage system 101b updates the volume management table 117b and the path management table 118b (1604). Upon the end of updating, the storage system 101*b* notifies the storage system 101*a* that the command to set the migration pair has been received (1605).

The storage system 101*a* notifies the host 102*b* that the command to set the migration pair has been received (1606).

Further, the host 102*b* sets the host-based path management table 204 as in the case of the path management tables 118*a* and 118*b*.

Next, the host 102*b* transmits a command to start migration to the storage system 101*a* (1607). The storage system 101*a* transmits the received command to the storage system 101*b* (1608). Then, the storage system 101*a* notifies the host 102*b* that the command to start the migration has been received (1609).

Upon the reception of the command to start the migration, the storage systems 101*a* and 101*b* start migration (1610, 1611).

When the host 102*b* transmits a reading or writing command during the migration executed by the storage systems 101*a* and 101*b* (1612), the host-based path management program 203 receives the command. Since the host-based path management program 203 has not received the path switching command yet, it has set an access path from the host 102*b* in the storage system 101*a* of the migration source. Thus, the host-based path management program 203 transmits the received reading or writing command to the storage system 101*a* (1613).

According to the received reading or writing command, the storage system 101*a* executes data reading or writing (input/output) (1614). However, the storage system 101*b* does not update data in an area to which the WORM attribute has been assigned.

When the host 102*b* transmits a command to add a new WORM area during the migration executed by the storage systems 101*a* and 101*b* (1615), the host-based path management program 203 receives the command. The host-based path management program 203 transmits the received command to the storage system 101*a* (1616). According to the received command, the storage system 101*a* updates the WORM attribute table 6092 (1617). Further, the storage system 101*a* transmits the received command to the storage system 101*b* (1618). According to the received command, the storage system 101*b* updates the WORM attribute table 6092 (1619). Upon the end of the updating, the storage system 101*b* transmits a notification that the WORM area has been added to the storage system 101*a* (1620). The storage system 101*a* transmits the notification that the WORM area has been added to the host 102*b* (1621).

Upon the end of the migration (1610, 1611), the storage system 101*a* executes a process of completing migration (FIG. 13) (1622). As a result, the volume management tables 117*a*, 117*b* and the path management tables 118*a*, 118*b* are updated. At this time, a path switching command (step 1306 of FIG. 13) is transmitted to the host-based path management program 203 (1623).

When the process of completing the migration 1622 comes to a normal end, the storage system 101*a* transmits a migration completion notification to the host 102*b* (1624).

After the completion of the migration, when the host 102*b* transmits a reading or writing command (1625), the host-based path management program 203 receives the command. Since it has received the path switching command (1623), the host-based path management program 203 has set an access path from the host 102*b* in the storage system 101*b* of the migration destination. Thus, the host-based path management program 203 transmits the received reading or writing command to the storage system 101*b* (1626).

According to the received reading or writing command, the storage system 101*b* executes data reading or writing (input/output) (1627). However, the storage system 101*b* does not update data in an area to which the WORM attribute has been assigned.

Figure 17:
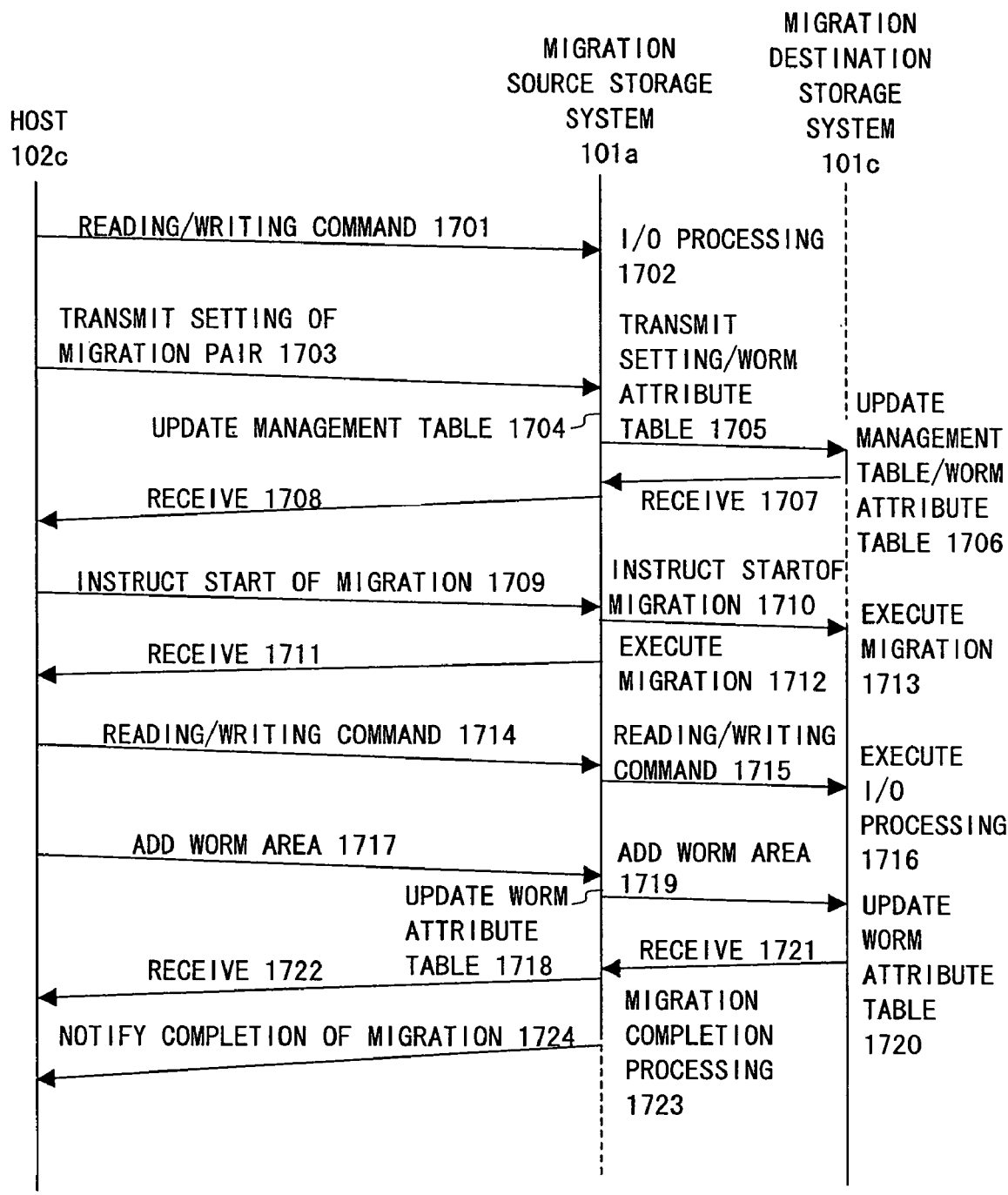
FIG. 17 is a sequence diagram of commands transferred between a host and the storage systems when migration to which the switching system before copying is applied is executed between the storage systems directly connected to each other in the computer system of the embodiment of this invention.

FIG. 17 is a sequence diagram of commands transferred between the host and the storage systems when migration to which the switching system before copying (FIG. 4) is applied is executed between the storage systems interconnected directly in the computer system of the embodiment of this invention.

For example, FIG. 17 shows a case in which the host 102*c* instructs migration from the migration source volume 301 in the storage system 101*a* to the migration destination volume 302 in the storage system 101*c* (see FIG. 3).

When the host 102*c* executes data reading or writing before the migration is started, it transmits a reading or writing command to the storage system 101*a* of the migration source (1701).

The path management program 113*a* of the storage system 101*a* refers to the path management table 118*a* to set an access path. Specifically, since migration is not started at this time, the path management program 113*a* sets an access path in the storage system 101*a* of the migration source. According to the received command, the storage system 101*a* executes data reading or writing (input/output) (1702). However, the storage system 101*a* does not update data in an area to which the WORM attribute has been assigned.

At the time of starting the migration, the host 102*c* first transmits a command to set a migration pair to the storage system 101*a* of the migration source (1703). According to the received command, the storage system 101*a* updates the volume management table 117*a* and the path management table 118*a* (1704). In the example of FIG. 17, since the switching system before copying is applied, the path switching 607 of the volume management table 117*a* and path switching 1008 of the path management table 118*a* are set to "DONE". As a result, an access path is set from the host 102*c* through the storage system 101*a* in the storage system 101*c*. Additionally, the storage system 101*a* transmits the received command and the WORM attribute table contained in the volume management table 117*a* to the storage system 101*c* of the migration destination (1705).

Specifically, the configuration management program 115*a* of the storage system 101*a* executes the process of starting the migration (see FIG. 11), and executes the process of setting the migration destination device in step 1108 (see FIG. 12).

According to the received command and the WORM attribute table, the storage system 101*c* updates the volume management table 117*c* and the path management table 118*c* (1706). In the example of FIG. 17, since the switching system before copying is applied, the path switching 607 of the volume management table 117*c* and the path switching 1008 of the path management table 118*c* are set to "DONE". As a result, the access path is set from the host 102*c* through the storage system 101*a* in the storage system 101*c*. Upon the end of updating, the storage system 101*c* notifies the storage system 101*a* that the command to set the migration pair has been received (1707).

The storage system 101*a* notifies the host 102*c* that the command to set the migration pair has been received (1708).

Next, the host 102*c* transmits a command to start migration to the storage system 101*a* (1709). The storage system 101*a* transmits the received command to the storage system

101c (1710). Then, the storage system 101a notifies the host 102c that the command to start the migration has been received (1711).

Upon the reception of the command to start the migration, the storage systems 101a and 101c start migration (1712, 1713). Specifically, the migration programs 114a and 114c copy data of the migration source volume 301 to the migration destination volume 302. In this case, as described above with reference to FIG. 14, the migration programs 114a and 114c refer to the copied bitmap 1016.

When the host 102c transmits a reading or writing command during the migration executed by the storage systems 101a and 101c (1714), the storage system 101a receives the command. An access path from the host 101c is set in the storage system 101c through the storage system 101a (1704, 1706). Thus, the storage system 101a transmits the received reading or writing command to the storage system 101c (1715).

According to the received reading or writing command, the storage system 101c executes data reading or writing (input/output) (1716). However, the storage system 101c does not update data in an area to which the WORM attribute has been assigned.

When the host 102c transmits a command to add a new WORM area during the migration executed by the storage systems 101a and 101c (1717), the storage system 101a receives the command. According to the received command, the storage system 101a updates the WORM attribute table 6093 (1718). Further, the storage system 101a transmits the received command to the storage system 101c (1719). According to the received command, the storage system 101c updates the WORM attribute table 6093 (1720).

Upon the end of the updating, the storage system 101c transmits a notification that the WORM area has been added to the storage system 101a (1721). The storage system 101a transmits the notification that the WORM area has been added to the host 102c (1722).

Upon the end of the migration (1712, 1713), the storage system 101a executes a process of completing migration (FIG. 13) (1723). As a result, the volume management tables 117a, 117c and the path management tables 118a, 118c are updated.

When the process of completing the migration comes to a normal end, the storage system 101a transmits a migration completion notification to the host 102c (1724).

Figure 18:
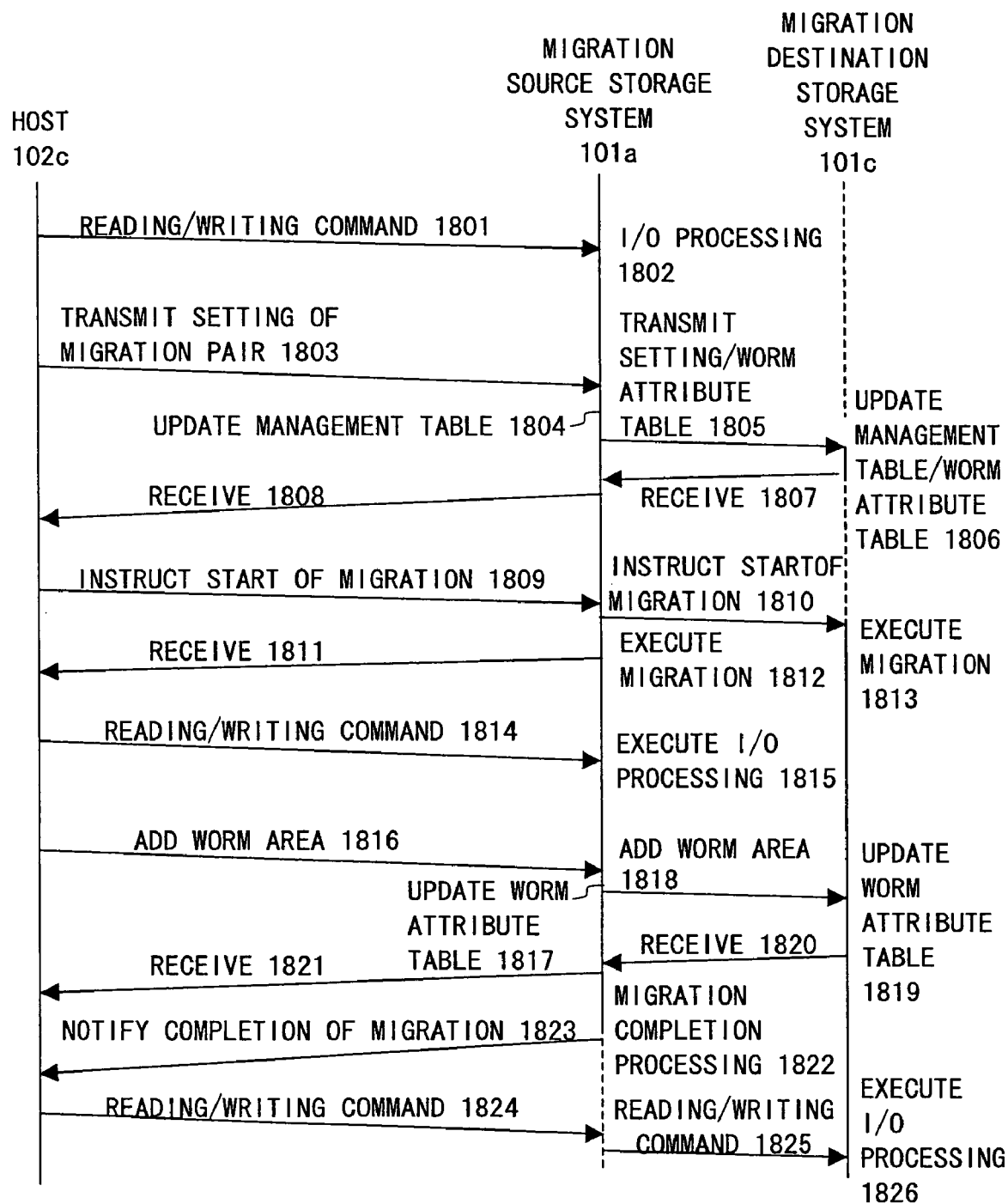
FIG. 18 is a sequence diagram of commands transferred between the host and the storage systems when migration to which the switching system after copying is applied is executed between the storage systems directly connected to each other in the computer system of the embodiment of this invention.

FIG. 18 is a sequence diagram of commands transferred between the host and the storage systems when migration to which the switching system after copying (FIG. 5) is applied is executed between the storage systems interconnected directly in the computer system of the embodiment of this invention.

As in the case of FIG. 17, FIG. 18 shows a case in which the host 102c instructs migration from the migration source volume 301 in the storage system 101a to the migration destination volume 302 in the storage system 101c (see FIG. 3). Detailed description of portions of FIG. 18 similar to those of FIG. 17 will be omitted.

When the host 102c executes data reading or writing before the migration is started, it transmits a reading or writing command to the storage system 101a of the migration source (1801).

According to the received command, the storage system 101a executes data reading or writing (input/output) (1802). However, the storage system 101a does not update data in an area to which the WORM attribute has been assigned.

At the time of starting the migration, the host 102c first transmits a command to set a migration pair to the storage system 101a of the migration source (1803). According to the received command, the storage system 101a updates the volume management table 117a and the path management table 118a (1804). In the example of FIG. 18, since the switching system after copying is applied, the path switching 607 of the volume management table 117a and path switching 1008 of the path management table 118a are set to "UNDONE". As a result, an access path is set from the host 102c in the storage system 101a. Additionally, the storage system 101a transmits the received command and the WORM attribute table contained in the volume management table 117a to the storage system 101c of the migration destination (1805).

According to the received command and the WORM attribute table, the storage system 101c updates the volume management table 117c and the path management table 118c (1806). In the example of FIG. 18, since the switching system after copying is applied, the path switching 607 of the volume management table 117c and the path switching 1008 of the path management table 118c are set to "UNDONE". As a result, the access path is set from the host 102c in the storage system 101a. Upon the end of updating, the storage system 101c notifies the storage system 101a that the command to set the migration pair has been received (1807).

The storage system 101a notifies the host 102c that the command to set the migration pair has been received (1808).

Next, the host 102c transmits a command to start migration to the storage system 101a (1809). The storage system 101a transmits the received command to the storage system 101c (1810). Then, the storage system 101a notifies the host 102c that the command to start the migration has been received (1811).

Upon the reception of the command to start the migration, the storage systems 101a and 101c start migration (1812, 1813).

When the host 102c transmits a reading or writing command during the migration executed by the storage systems 101a and 101c (1814), the storage system 101a receives the command. An access path from the host 101c is set in the storage system 101a (1804, 1806). Thus, according to the received reading or writing command, the storage system 101a executes data reading or writing (input/output) (1815). However, the storage system 101a does not update data in an area to which the WORM attribute has been assigned.

When the host 102c transmits a command to add a new WORM area during the migration executed by the storage systems 101a and 101c (1816), the storage system 101a receives the command. According to the received command, the storage system 101a updates the WORM attribute table 6093 (1817). Further, the storage system 101a transmits the received command to the storage system 101c (1818). According to the received command, the storage system 101c updates the WORM attribute table 6093 (1819).

Upon the end of the updating, the storage system 101c transmits a notification that the WORM area has been added to the storage system 101a (1820). The storage system 101a transmits the notification that the WORM area has been added to the host 102c (1821).

Upon the end of the migration (1812, 1813), the storage system 101a executes a process of completing migration (FIG. 13) (1822). As a result, the volume management tables 117a, 117c and the path management tables 118a, 118c are updated. At this time, the path switching 607 of the volume management table 117a and path switching 1008 of the path management table 118a are set to "DONE". Similarly, the path switching 607 of the volume management table 117c and path switching 1008 of the path management table 118*c* are set to "DONE". That is, an access path is set from the host 102*c* through the storage system 101*a* in the storage system 101*c*.

When the process of completing the migration comes to a normal end, the storage system 101*a* transmits a migration completion notification to the host 102*c* (1823).

When the host 102*c* transmits a reading or writing command after completion of the migration (1824), the storage system 101*a* receives the command. An access path is set from the host 101*c* in the storage system 101*c* through the storage system 101*a* (1822). Thus, the storage system 101*a* transmits the received reading or writing command to the storage system 101*c* (1825).

According to the received reading or writing command, the storage system 101*c* executes data reading or writing (input/output) (1826). However, the storage system 101*c* does not update data in an area to which the WORM attribute has been assigned.

Figure 19:
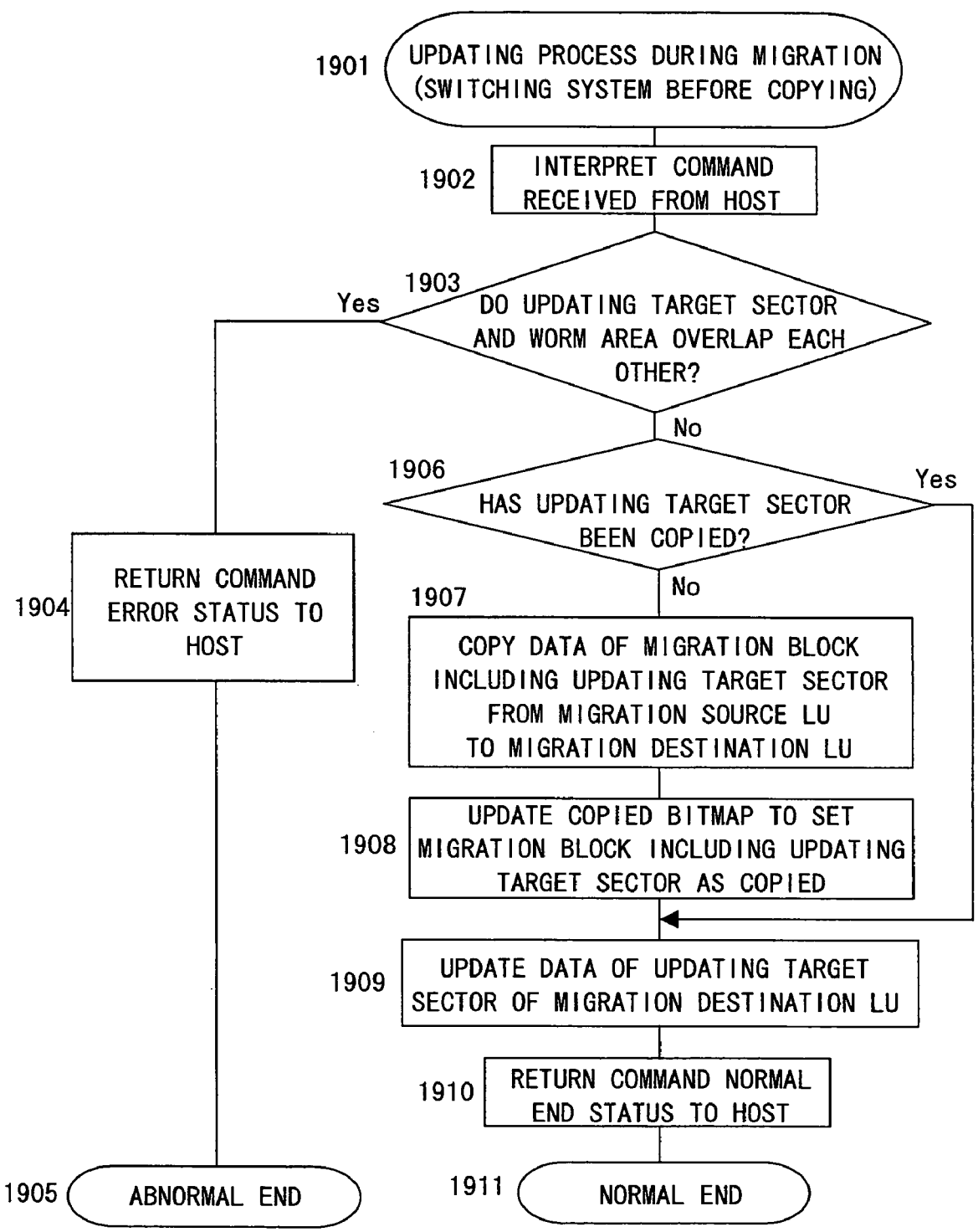
FIG. 19 is a flowchart showing an updating process executed by the I/O processing program when a writing request comes from the host to update data during migration to which the switching system before copying is applied in the computer system according to the embodiment of this invention.

FIG. 19 is a flowchart showing an updating process executed by the I/O processing program 112 when a writing request comes from the host to update data during migration to which the switching system before copying is applied in the computer system according to the embodiment of this invention.

When the updating process is started upon reception of a data writing request from the host 102 (1901), the I/O processing program 112 interprets a command received from the host (1902).

Next, the I/O processing program 112 refers to the WORM attribute table 6091 or the like contained in the volume management table 117 to determine whether a sector of data updating (updating target sector) and a WORM area overlaps each other. That is, determination is made as to whether the WORM attribute has been assigned to the updating target sector (1903).

If the WORM attribute has been assigned to the updating target sector, since data of the sector cannot be updated, the I/O processing program 112 returns a command error status to the host 102 (1904), and brings the updating process to an abnormal end (1905).

On the other hand, if there is no WORM attribute assigned to the updating target sector, the I/O processing program 112 refers to the copied bitmap 1014 or the like contained in the path management table 118 to determine whether the updating target sector has been copied (1906).

If the updating target sector has been copied, the process proceeds to step 1909.

On the other hand, if the updating target sector has not been copied, the I/O processing program 112 copies data of a migration block including the updating target sector from the migration source volume to the migration destination volume (1907). Additionally, the I/O processing program 112 updates the copied bitmap 1014 or the like so as to set the copied flag of the migration block to "COPIED" (1908).

Executing steps 1907 and 1908 can prevent the migration program 114 overwriting of old data of the migration source volume on new data updated of the migration destination volume.

However, when all the sectors included in one migration block are targets of updating, the I/O processing program 112 need not execute step 1907.

Next, the I/O processing program 112 updates data of the updating target sector of the migration destination volume (1909).

Next, the I/O processing program 112 returns a command normal end status to the host 102 (1910), and brings the updating process to a normal end (1911).

Figure 20:
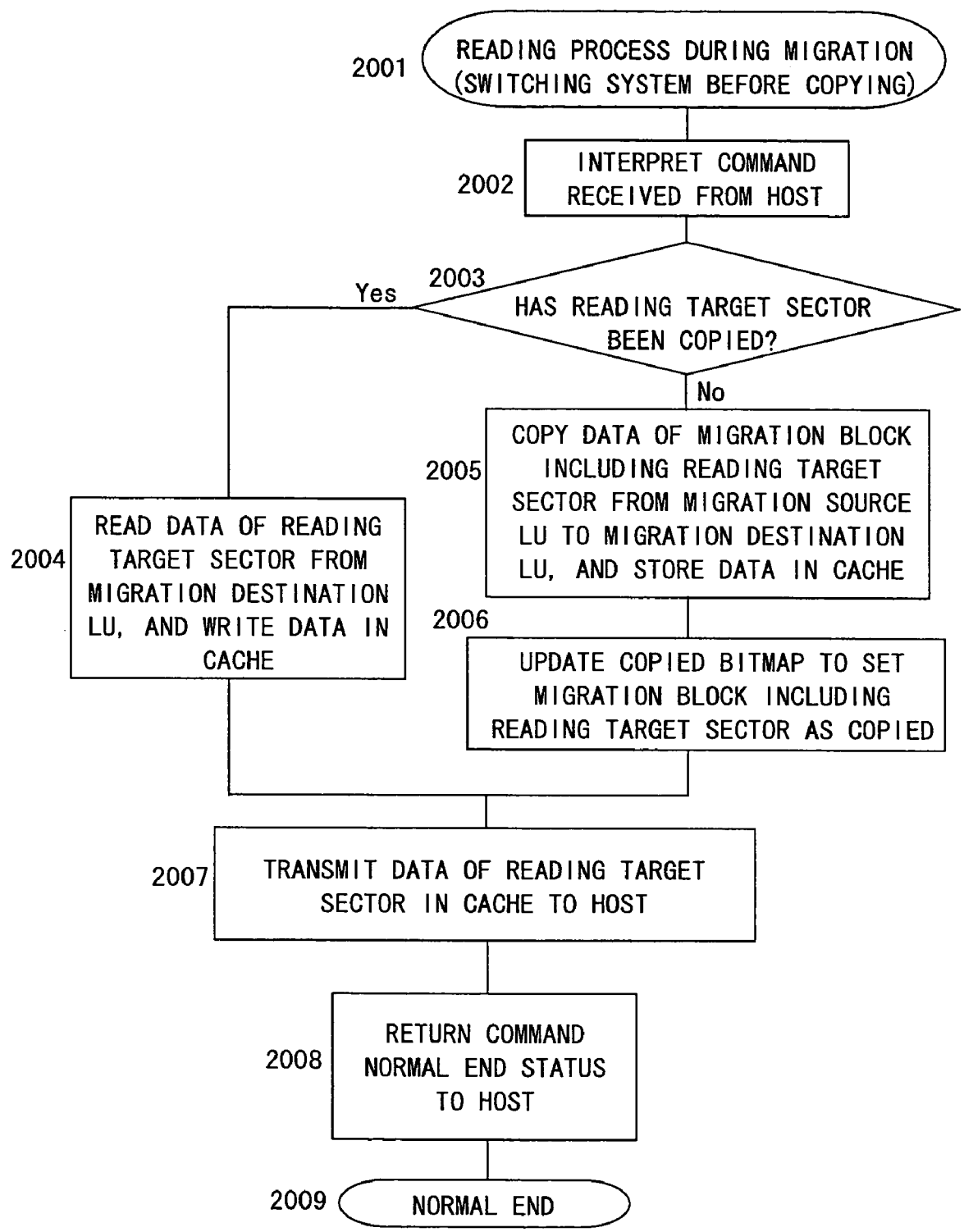
FIG. 20 is a flowchart showing a reading process executed by the I/O processing program when a data reading request comes from the host during migration to which the switching system before copying is applied in the computer system according to the embodiment of this invention.

FIG. 20 is a flowchart showing a reading process executed by the I/O processing program 112 when a data reading request comes from the host during migration to which the switching system before copying is applied in the computer system according to the embodiment of this invention.

When the reading process is started upon reception of the data reading request from the host 102 (2001), the I/O processing program 112 interprets a command received from the host (2002).

Next, the I/O processing program 112 refers to the copied bitmap 1014 or the like contained in the path management table 118 to determine whether a sector of data reading (reading target sector) has been copied (2003).

If a reading target sector has been copied, the I/O processing program 112 reads data of the reading target sector from the migration destination volume, and writes the data in the cache memory 110 (2004).

On the other hand, if the reading target sector has not been copied, the I/O processing program 112 copies data of the migration block including the reading target sector from the migration source volume to the migration destination volume (2005). At this time, the copied data is stored in the cache memory 110.

Next, the I/O processing program 112 updates the copied bitmap 1014 or the like so as to set the copied flag of the migration block to "COPIED" (2006).

Next, the I/O processing program 112 reads the data of the reading target sector from the cache memory 110, and transmits the data to the host 102 (2007).

Next, the I/O processing program 112 returns a command normal end status to the host 102 (2008), and brings the reading process to a normal end (2009).

Figure 21:
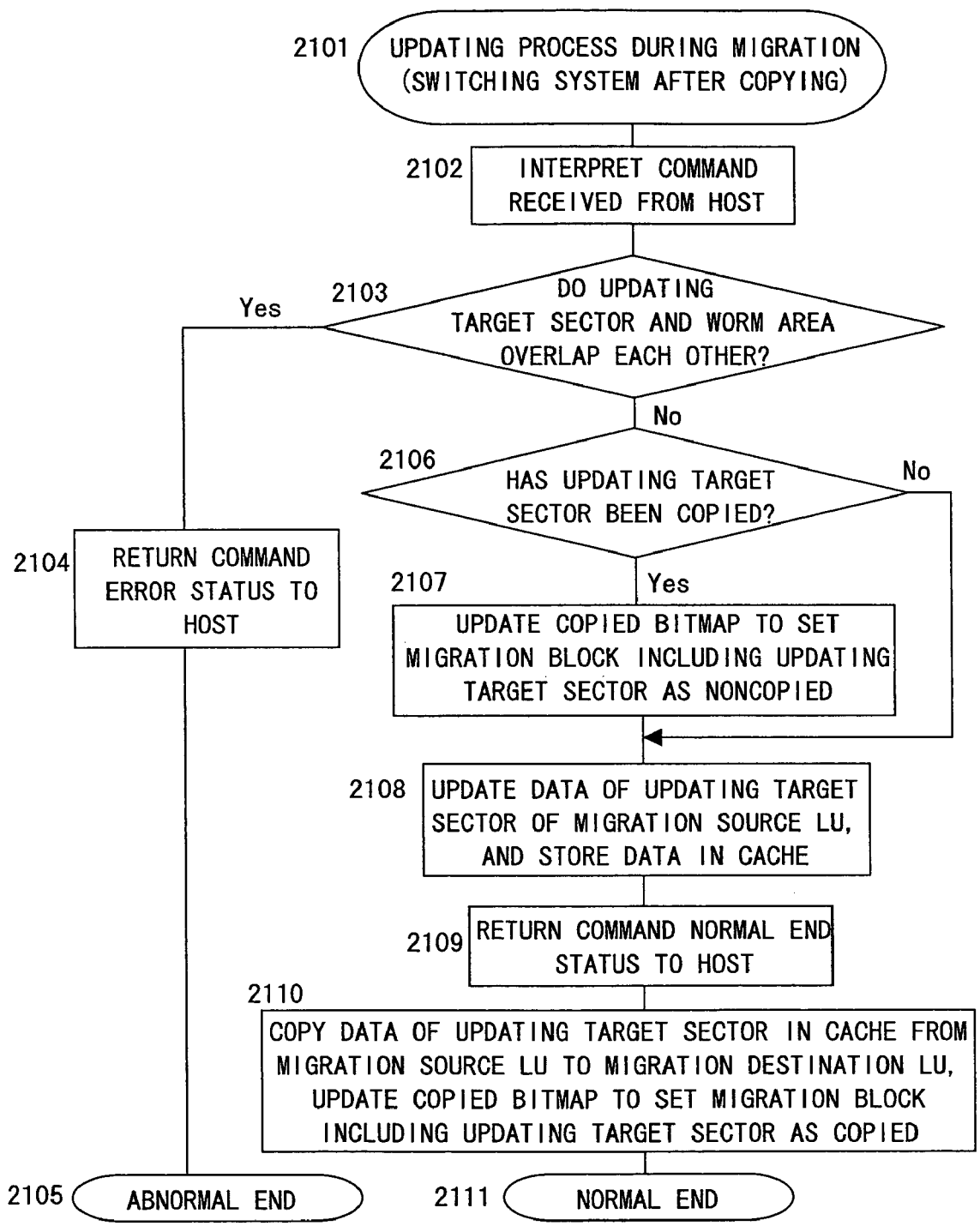
FIG. 21 is a flowchart showing an updating process executed by the I/O processing program when a writing request comes from the host to update data during migration to which the switching system after copying is applied in the computer system according to the embodiment of this invention.

FIG. 21 is a flowchart showing an updating process executed by the I/O processing program 112 when a writing request comes from the host to update data during migration to which the switching system after copying is applied in the computer system according to the embodiment of this invention.

When the updating process is started upon reception of a data writing request from the host 102 (2101), the I/O processing program 112 interprets a command received from the host (2102).

Next, the I/O processing program 112 refers to the WORM attribute table 6091 or the like contained in the volume management table 117 to determine whether a sector of data updating and a WORM area overlaps each other. That is, determination is made as to whether the WORM attribute has been assigned to the updating target sector (2103).

If the WORM attribute has been assigned to the updating target sector, since data of the sector cannot be updated, the I/O processing program 112 returns a command error status to the host 102 (2104), and brings the updating process to an abnormal end (2105).

On the other hand, if there is no WORM attribute assigned to the updating target sector, the I/O processing program 112 refers to the copied bitmap 1014 or the like contained in the path management table 118 to determine whether the updating target sector has been copied (2106).

If the updating target sector has not been copied, the process proceeds to step 2108.

On the other hand, if the updating target sector has been copied, the I/O processing program 112 updates the copied bitmap 1014 or the like so as to set the copied flag of the migration block including the updating target sector to "NONCOPIED" (2107).

Next, the I/O processing program 112 updates data of the updating target sector of the migration source volume, and writes the updated data in the cache memory 110 (2108).

Next, the I/O processing program 112 returns a command normal end status to the host 102 (2109).

Next, the I/O processing program 112 copies the data of the updating target sector written in the cache memory 110 to the migration destination volume. Then, the I/O processing program 112 updates the copied bitmap 1014 or the like so as to set the copied flag of the migration block including the sector to "COPIED" (2110).

Thus, the updating process comes to a normal end (2111).

Figure 22:
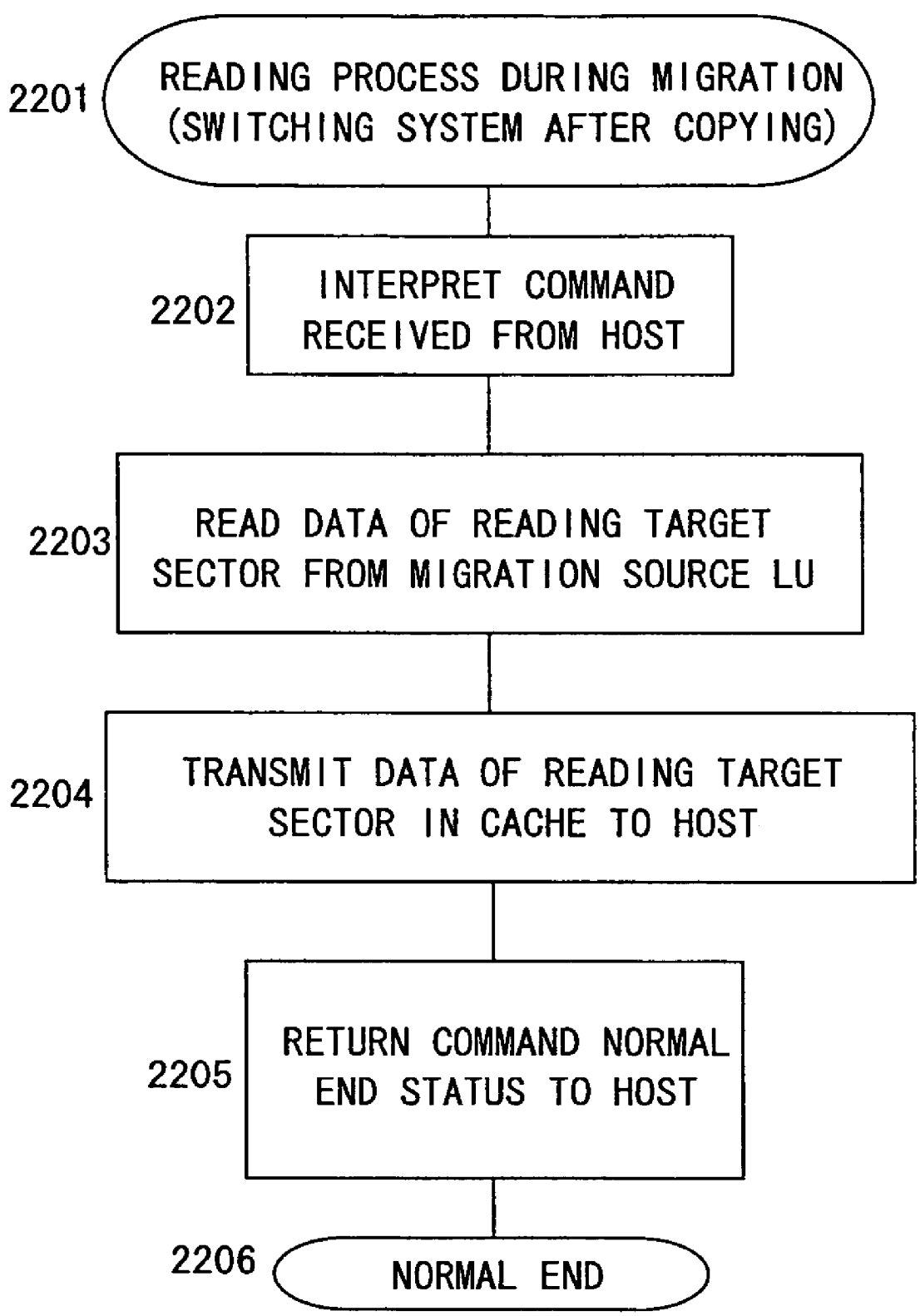
FIG. 22 is a flowchart showing a reading process executed by the I/O processing program when a data reading request comes from the host during migration to which the switching system after copying is applied in the computer system according to the embodiment of this invention.

FIG. 22 is a flowchart showing a reading process executed by the I/O processing program 112 when a data reading request comes from the host during migration to which the switching system after copying is applied in the computer system according to the embodiment of this invention.

When the reading process is started upon reception of the data reading request from the host 102 (2201), the I/O processing program 112 interprets a command received from the host (2202).

Next, the I/O processing program 112 reads data of the reading target sector from the migration source volume, and writes the data in the cache memory 110 (2203).

Next, the I/O processing program 112 reads the data of the reading target sector from the cache memory 110, and transmits the data to the host 102 (2204).

Next, the I/O processing program 112 returns a command normal end status to the host 102 (2205), and brings the updating process to a normal end (2206).

As described above, according to this invention, the WORM attribute of the data is copied along with the data when the migration is executed. Thus, even during the copying, the data to which the WORM attribute has been assigned is protected from being updated. Moreover, the data to which the WORM attribute has been assigned before copying is protected as in the case before the copying even without assigning the WORM attribute again after the end of the copying.

Furthermore, according to this invention, by releasing the WORM attribute after the end of data copying, it is possible to reuse the area of the migration source to which the WORM attribute has been assigned.

What is claimed is:

1. A storage system coupled to a computer through a network, comprising:
   a controller and a disk drive coupled to the controller to communicate therewith, wherein
   the disk drive includes a plurality of logical volumes, at least in one of which updating prohibition information indicating inclusion of an area assigned an updating prohibition attribute is recorded; and
   the controller includes:
   a configuration management module that sets the logical volume assigned the updating prohibition attribute as a logical volume of a migration source, another logical volume as a logical volume of a migration destination, and the updating prohibition information concerning the logical volume of the migration source in the logical volume of the migration destination; and
   a migration module that copies data of the logical volume of the migration source to the logical volume of the migration destination after the setting of the updating prohibition information concerning the logical volume of the migration source in the logical volume of the migration destination.

2. The storage system according to claim 1, wherein the controller further comprises:
   a path management module that sets an access path having been set between the computer and the logical volume of the migration source between the computer and the logical volume of the migration destination before execution of the copying after the setting of the updating prohibition information concerning the logical volume of the migration source in the logical volume of the migration destination; and
   an I/O processing module that executes a writing or reading request from the computer for the logical volume of the migration destination through the set access path during the copying, and cannot update data in an area of the logical volume of the migration destination to which the updating prohibition attribute has been assigned; and
   the migration module cannot update data in an area, for which the copying has been finished, of the logical volume of the migration destination.

3. The storage system according to claim 1, wherein the controller further comprises:
   a path management module that sets an access path having been set between the computer and the logical volume of the migration source between the computer and the logical volume of the migration destination after execution of the copying; and
   an I/O processing module that executes a writing or reading request from the computer to the logical volume of the migration source through the set access path during the copying, and cannot update data of the logical volume of the migration destination; and
   the migration module cannot update data in an area of the logical volume of the migration destination for which the copying has been finished and to which the updating prohibition attribute has been assigned.

4. A computer system comprising:
   a computer;
   a plurality of storage systems; and
   a network that interconnects the computer and at least one of the plurality of storage systems, wherein:
   each storage system comprises a controller, and a disk drive coupled to the controller to communicate therewith;
   the disk drive includes one or a plurality of logical volumes, at least in one of which updating prohibition information indicating inclusion of an area assigned an updating prohibition attribute is recorded; and
   the controller includes: a configuration management module that sets the logical volume included in one of the storage systems and assigned the updating prohibition attribute as a logical volume of a migration source, the logical volume included in another storage system as a logical volume of a migration destination, and the updating prohibition information concerning the logical volume of the migration source in the logical volume of the migration destination; and
   a migration module that copies data of the logical volume of the migration source to the logical volume of the migration destination after the setting of the updating prohibition information concerning the logical volume of the migration source in the logical volume of the migration destination.

5. The computer system according to claim 4, further comprising
a path management module that sets an access path having been set between the computer and the logical volume of the migration source between the computer and the logical volume of the migration destination before execution of the copying after the setting of the updating prohibition information concerning the logical volume of the migration source in the logical volume of the migration destination, wherein:
the controller further includes an I/O processing module that executes a writing or reading request from the computer to the logical volume of the migration destination through the set access path during the copying, and cannot update data in an area of the logical volume of the migration destination to which the updating prohibition attribute has been assigned; and
the migration module cannot update data in an area of the logical volume of the migration destination for which the copying has been finished.

6. The computer system according to claim 5, wherein:
the storage system of the migration source including the logical volume of the migration source is coupled to the computer through the network; and
the storage system of the migration destination including the logical volume of the migration destination is coupled to the computer through the network.

7. The computer system according to claim 5, wherein:
the storage system of the migration source including the logical volume of the migration source is coupled to the computer through the network; and
the storage system of the migration destination including the logical volume of the migration destination is coupled to the storage system of the migration source to communicate therewith.

8. The computer system according to claim 5, wherein:
the storage system of the migration destination including the logical volume of the migration destination is coupled to the computer through the network; and
the storage system of the migration source including the logical volume of the migration source is coupled to the storage system of the migration destination to communicate therewith.

9. The storage system according to claim 4, further comprising
a path management module that sets an access path having been set between the computer and the logical volume of the migration source between the computer and the logical volume of the migration destination after execution of the copying wherein:
the controller further includes an I/O processing module that executes a writing or reading request from the computer to the logical volume of the migration source through the set access path during the copying, and cannot update data of the logical volume of the migration destination; and
the migration module cannot update data in an area of the logical volume of the migration destination for which the copying has been finished and to which the updating prohibition attribute has been assigned.

10. The computer system according to claim 9, wherein:
the storage system of the migration source including the logical volume of the migration source is coupled to the computer through the network; and
the storage system of the migration destination including the logical volume of the migration destination is coupled to the computer through the network.

11. The computer system according to claim 9, wherein:
the storage system of the migration source including the logical volume of the migration source is coupled to the computer through the network; and
the storage system of the migration destination including the logical volume of the migration destination is coupled to the storage system of the migration source to communicate therewith.

12. The computer system according to claim 9, wherein:
the storage system of the migration destination including the logical volume of the migration destination is coupled to the computer through the network; and
the storage system of the migration source including the logical volume of the migration source is coupled to the storage system of the migration destination to communicate therewith.

13. A data migration method for migrating data stored in a storage system that is coupled to a computer through a network and comprises: a controller; and a disk drive coupled to the controller to communicate therewith,
the disk drive including a plurality of logical volumes, at least in one of which updating prohibition information indicating inclusion of an area assigned an updating prohibition attribute is recorded,
the method comprising:
a first step of setting the logical volume assigned the updating prohibition attribute as a logical volume of a migration source and another logical volume as a logical volume of a migration destination;
a second step of setting the updating prohibition information concerning the logical volume of the migration source in the logical volume of the migration destination; and
a third step of copying data of the logical volume of the migration source to the logical volume of the migration destination.

14. The data migration method according to claim 13, further comprising
a fourth step of setting an access path having been set between the computer and the logical volume of the migration source between the computer and the logical volume of the migration destination after execution of the second step before execution of the third step, wherein
the third step includes prohibiting updating of data in an area of the logical volume of the migration destination by the computer to which the updating prohibition attribute has been assigned, and updating of data in an area of the logical volume of the migration destination by the copying for which the copying has been finished.

15. The data migration method according to claim 13, further comprising
a fifth step of setting an access path having been set between the computer and the logical volume of the migration source between the computer and the logical volume of the migration destination after execution of the third step, wherein
the third step includes prohibiting updating of data in an area of the logical volume of the migration destination by the computer, and updating of data in an area of the logical volume of the migration destination by the copying for which the copying has been finished and to which the updating prohibition attribute has been assigned.

* * * * *